United States Patent
Kuwahara et al.

(10) Patent No.: US 6,873,437 B1
(45) Date of Patent: Mar. 29, 2005

(54) IMAGE PROCESSING METHOD AND IMAGE PROCESSING APPARATUS

(75) Inventors: Yasuhiro Kuwahara, Osaka-fu (JP); Akio Kojima, Osaka-fu (JP); Tatsumi Watanabe, Kyoto-fu (JP); Hirotaka Oku, Osaka-fu (JP); Toshiharu Kurosawa, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 892 days.

(21) Appl. No.: 09/689,697

(22) Filed: Oct. 13, 2000

(30) Foreign Application Priority Data

Oct. 14, 1999 (JP) .......................................... 11-292027

(51) Int. Cl.$^7$ .............................................. G06K 15/00
(52) U.S. Cl. ...................................... 358/1.9; 358/3.01
(58) Field of Search ......................... 368/1.1, 1.7, 1.9, 368/3.01, 3.06, 3.1, 3.2, 3.21, 465, 1.2, 3.14, 3.16, 3.27, 2.1

(56) References Cited

U.S. PATENT DOCUMENTS

| | | | |
|---|---|---|---|
| 4,692,811 A | | 9/1987 | Tsuchiya et al. ............. 358/465 |
| 5,402,124 A | * | 3/1995 | Todd et al. .................. 341/131 |
| 5,475,492 A | * | 12/1995 | Yukawa ....................... 356/401 |
| 5,761,642 A | * | 6/1998 | Suzuki et al. ................ 704/503 |
| 5,784,500 A | * | 7/1998 | Homma et al. .............. 382/270 |
| 5,794,180 A | * | 8/1998 | McCree ....................... 704/212 |
| 6,292,589 B1 | * | 9/2001 | Chow et al. ................. 382/239 |
| 6,385,588 B2 | * | 5/2002 | Van Der Vleuten ........ 704/504 |
| 6,430,534 B1 | * | 8/2002 | Bett ............................ 704/500 |

FOREIGN PATENT DOCUMENTS

JP 7-93684 10/1995

OTHER PUBLICATIONS

"Multilevel Halftoning Algorithm for High–Quality Hard-copying" by Kurosawa et al., Proceedings of the SID, vol. 32, No. 2 (1991), pp. 145–151.

* cited by examiner

Primary Examiner—Gabriel Garcia
(74) Attorney, Agent, or Firm—McDermott Will & Emery LLP

(57) ABSTRACT

An image processing method and image processing apparatus in which the densities around the object pixel are integrated and re-allocated. Level division means divides an original image belonging to a scanning window into specific division levels or divides re-allocated image data and inputted image data into specific division levels. Means for calculation of allocation values by levels finds the sum of re-allocation values by division levels and adds a multi-leveling error in case of specific levels. Furthermore, the means finds an allocation number and residual by dividing the sum thus obtained by the maximum value within the division level. Means for re-allocation by levels allocates, by division levels, the maximum values and residuals within the respective division levels in the allocation number according to the rank order obtained by ranking means and stores the data in storage means for re-allocation by levels. Then, the values at the position of the object pixel in storage means for re-allocation by levels are multi-leveled.

32 Claims, 20 Drawing Sheets

FIG.2

| 40 | 140 | 50 |
|---|---|---|
| 30 | 150 | 200 |
| 60 | 180 | 210 |

(a)

| 8 | 5 | 7 |
|---|---|---|
| 9 | 4 | 2 |
| 6 | 3 | 1 |

(b)

| 10 | 120 | 85 |
|---|---|---|
| 0 | 170 | 190 |
| 85 | 170 | 210 |

(c)

| 10 | 85 | 85 |
|---|---|---|
| 0 | 85 | 85 |
| 85 | 85 | 85 |

(d)

| 0 | 35 | 0 |
|---|---|---|
| 0 | 85 | 85 |
| 0 | 85 | 85 |

(e)

| 0 | 0 | 0 |
|---|---|---|
| 0 | 0 | 20 |
| 0 | 0 | 40 |

(f)

| 10 | 85 | 85 |
|---|---|---|
| 0 | 85 | 85 |
| 85 | 85 | 85 |

(g)

| 0 | 35 | 0 |
|---|---|---|
| 0 | 85 | 85 |
| 0 | 85 | 85 |

(h)

| 0 | 0 | 0 |
|---|---|---|
| 0 | 0 | 0 |
| 0 | 0 | 60 |

(i)

| 10 | 120 | 85 |
|---|---|---|
| 0 | 170 | 170 |
| 85 | 170 | 230 |

|  |  |  |
|---|---|---|
| 40 | 140 | 50 |
| 30 | 150 | 200 |
| 60 | 180 | 210 |

(a)

|  |  |  |
|---|---|---|
| 8 | 5 | 7 |
| 9 | 4 | 2 |
| 6 | 3 | 1 |

(b)

|  |  |  |
|---|---|---|
| 10 | 120 | 85 |
| 0 | 170 | 190 |
| 85 | 170 | 210 |

(c)

|  |  |  |
|---|---|---|
| 10 | 0 | 85 |
| 0 | 0 | 0 |
| 85 | 0 | 0 |

(d)

|  |  |  |
|---|---|---|
| 0 | 120 | 0 |
| 0 | 170 | 0 |
| 0 | 0 | 0 |

(e)

|  |  |  |
|---|---|---|
| 0 | 0 | 0 |
| 0 | 0 | 190 |
| 0 | 170 | 210 |

(f)

|  |  |  |
|---|---|---|
| 10 | 0 | 85 |
| 0 | 0 | 0 |
| 85 | 0 | 0 |

(g)

|  |  |  |
|---|---|---|
| 0 | 120 | 0 |
| 0 | 170 | 0 |
| 0 | 0 | 0 |

(h)

|  |  |  |
|---|---|---|
| 0 | 0 | 0 |
| 0 | 0 | 170 |
| 0 | 170 | 230 |

(i)

|  |  |  |
|---|---|---|
| 10 | 120 | 85 |
| 0 | 170 | 170 |
| 85 | 170 | 230 |

|     |     |
|-----|-----|
| 180 | 170 |
| 160 | 70  |

(a)

|   |   |
|---|---|
| 1 | 2 |
| 3 | 4 |

(b)

|     |     |
|-----|-----|
| 170 | 170 |
| 170 | 70  |

(c)

|    |    |
|----|----|
| 85 | 85 |
| 85 | 85 |

(d)

|    |    |
|----|----|
| 85 | 85 |
| 85 | 0  |

(e)

|     |     |
|-----|-----|
| 170 | 170 |
| 170 | 85  |

|     |     |
|-----|-----|
| 180 | 170 |
| 160 | 0   |

(a)

|   |   |
|---|---|
| 1 | 2 |
| 3 | 4 |

(b)

|     |     |
|-----|-----|
| 170 | 170 |
| 170 | 0   |

(c)

|    |    |
|----|----|
| 85 | 85 |
| 85 | 85 |

(d)

|    |    |
|----|----|
| 85 | 85 |
| 0  | 0  |

(e)

|     |     |
|-----|-----|
| 170 | 170 |
| 85  | 85  |

(f)

US 6,873,437 B1

IMAGE PROCESSING METHOD AND IMAGE PROCESSING APPARATUS

BACKGROUND OF THE INVENTION

1. Field of the Invention

The present invention relates to an image processing method and image processing apparatus in which infinite gradation images are quantized into several gradation levels.

2. Description of the Prior Art

With the spread of personal computers, the demand for printers has increased by leaps and bounds and the printers have been improved in picture quality in recent years. In ink jet printers, for example, full colors used to be expressed with respective colors processed in bi-levels, but now high picture quality can be obtained with multi-leveled (quantized into multi-levels) color processing. To express multi-leveled images with a small data size, it is common to make pseudo gradation by digital half-tone processing. The techniques often applied to achieve this pseudo gradation include the dithering method and the error diffusion method.

Among the pseudo gradation processing methods is the adjacent density integrated re-allocation method. Multi-leveling by this method is disclosed in Japanese Patent Publicized Gazette No. 7-93684. (Japanese Patent No. 2058828). (For further details, see Proceeding of the SID Vol. 32/2, 1991 P. 145–151.) In the adjacent density integrated re-allocation method, the adjacent density values (densities of the adjacent pixels around the object pixel) are first added up, and the value from the addition is re-allocated in a pixel with a high density, which makes letters and line drawings stand out.

FIG. 21 is a block diagram of the multi level correlative density assignment of adjacent pixels (CAPIX) method shown in FIG. 1 of Japanese Patent Publicized Gazette No. 7-93684.

An original image is scanned by original image scanning means G1, and thus image data is obtained (wherein image data is synonymous with density data). Storage means G6 for re-allocation stores the output data of this original image scanning means G1, that is, image data G11 of the original image and the output data of re-allocation means G9, that is, storage data G22 for re-allocation, which will be describe later, and then outputs image data G18 of a scanning window (a adjacent frame of specific pixels including the object pixel and input pixels).

Allocation value calculation means G7 adds up the output data of storage means G6 for re-allocation, that is, image data G18 of the scanning window and the output data of allocation error calculation means G8, that is, allocation error G20, which will be described later. Furthermore, allocation number N and residual A are found by dividing the addition result by gradation unit Cn. The gradation unit Cn becomes a value (in the case of n=4 in 8 bits, 85) obtained by dividing the maximum value of image signal (in the case of 8 bits, 255) by n−1 (n: number of gradations). Furthermore, half-valued gradation unit Cn/2, the gradation unit Cn halved, and the residual A are compared. When the residual A is equal or larger than the half-value, a corrected allocation number N+1 obtained by adding 1 to the allocation number N is outputted. In case the residual A is smaller than the half-valued image data, the allocation number N as it is outputted.

Meanwhile, the output data of original image scanning means G1, that is, image data G11 of the original image is also stored in storage means G4 for ranking, and this storage means G4 for ranking outputs image data of the scanning window. The picture image data G15 and neighborhood correction quantity G16, that is, the output of ranking correction means G3, which will be described later, are inputted to ranking means G5 where the image data of pixels in the scanning window are compared to decide on the pixel ranking.

In re-allocation means G9, the allocation number N (or N+1) and the number M of pixels in the scanning window are compared. When N (or N+1) is smaller than the number M of pixels in the scanning window, a specific gradation unit Cn and 0 are allocated to the position of respective pixels according to the ranking order. When N (or N+1) is equal to the number M of pixels, a specific gradation unit Cn is allocated to the position of respective pixels. And when N (or N+1) is larger than the number M of pixels, a specific gradation unit Cn is added and allocated to the position of respective pixels according to the ranking order.

In allocation error calculation means G8, an allocation error is worked out using the sum or the output of allocation value calculation means G7 and the residual A and allocation number N (or N+1), and the allocation error thus obtained is outputted. Furthermore, ranking correction means G3 outputs a neighborhood correction quantity G16 and new ranking correction quantity G13 with the following data as input: pixel data G14 of object pixel, the output data of storage means G6 for re-allocation, that is, multi-leveled data G23 of re-allocated pixels, and the output data of correction quantity storage means G2, which will be described later. Moreover, it is so arranged that the output signal of storage means G36 for re-allocation, that is, multi-leveled data G23 of the re-allocated pixels are inputted into image print/display means G10, which records or displays multi-leveled images.

A concrete example of the conventional multi-leveled or four-leveled (quantized into four levels) adjacent density integrated re-allocation method is shown in FIG. 22 in which two-column, two-row scanning windows are used. FIG. 22(a) shows part of the values obtained by original image scanning means G1 and stored in storage means G4 for ranking. The pixel at the upper left (column 1, row 1) is the object pixel, and pixel at the lower right corresponds to the input pixel. If the density value is expressed in four-leveled image data from "0" to "255," gradation unit Cn is "85" which is obtained by dividing "255" by (4−1), that is, "3." The density values in the scanning window ranked by ranking means G5 are shown in FIG. 22(b). It is noted that for purpose of simplicity, the neighborhood correction quantity outputted from ranking correction means G3 is ignored. The data stored in storage means G6 for re-allocation is shown in FIG. 22(c). The image data value at the lower right "70" is a newly inputted value.

If it is assumed that the allocation error value G20 of the previous pixel outputted from allocation error calculation means G8 is "20" and put to arithmetic execution, the sum in FIG. 22(c) of the density values of the respective pixels and allocation error value G20 of the previous pixel is "600." Here, when the gradation unit Cn is allocated to the position of respective pixels, the number of allocations which means how many times the gradation unit Cn is allocated to the position of respective pixels is "7" and residual G21 is "5" because gradation unit Cn is "85."

On the basis of the calculation, re-allocation means G9 carries out density re-allocation as follows. That is, since the number of allocations is "7" and is larger than the number "4" of pixels in the window, four pieces of "85" are first allocated as shown in FIG. 22(d), and then the remaining three pieces of "85" are allocated in as shown in FIG. 22(e). If the values thus allocated of the pixels are added up, re-allocation values are obtained as shown in FIG. 22(f).

But the problem with the method disclosed in Japanese Patent Publicized Gazette No. 7-93684 is that multi-leveled letters and line drawings get blur in the edge as shown in FIG. 23 though no such problem is encountered with bi-levels.

If the inputted value at the lower right in FIG. 23(a) is "0" under the same conditions as in FIG. 22, the re-allocation values finally obtained will be as in FIG. 23(f). In this case, residual G21 is a value "20." Image patterns as shown in FIG. 23 tend to occur in the edges of letters and line drawings. The inputted value at the lower right would be 0 and the re-allocation value "85," which means that the density rises with the image blurred.

SUMMARY OF THE INVENTION

In view of the prior art described above, including the disadvantages and deficiencies of the prior art, the present invention is proposed and it is an object of the present invention to provide an image recording method and apparatus which produces line drawings with clear edges and permits smoothing as necessary.

To attain the object, the present invention adopts the following means.

That is, in an image processing method in which the original image is quantized into n-levels and outputted, ranking means (first ranking means) first ranks the respective pixels in a specific area (hereafter scanning window) of the original image including the object pixel, adjacent pixels around that pixel and inputted pixel according to the values of image data of the respective pixels.

Meanwhile, level dividing means extracts image data that belong to the same levels as at the time when the respective pixels re-allocated in the scanning window and the inputted image data are divided in (n–1) levels in the scanning window. Means for calculation of number of divisions by levels works out the sum of re-allocation values, that is, the sum of image data of the respective pixels thus divided into levels, and works out the allocation number—quotient obtained when the sum of the re-allocation values is divided by a specific value—and residual for each level. And means for re-allocation by levels re-allocates the specific values and the residual in the same number as the allocation number by levels. Finally, the sum of re-allocation values at the position of the object pixel is quantized into n-levels by multi-leveling means and then outputted.

The means for division by levels divides the inputted image in (n–1) levels and puts them in the scanning window in the respective pixels where data have been re-allocated in the scanning window and divided by levels in the preceding processing (first level division means). Or the level division means divides in (n–1) levels the sum of image data of the respective pixels and the input image data. Where the above the sum is the one that respective pixels obtained by the means for re-allocation by levels and re-allocated by levels within the scanning window are added by pixel (second level division means).

Level division by the level division means (by either the first or second level division means) is possible to effect by two methods. In the one method, the image data within the range of the object division level is given a value obtained by subtracting from the image data the maximum value of the level immediately below; the image data not smaller than the maximum value on the object division level is given the maximum value of the object division level; and the image data not higher than the minimum value of the object division level is given "0." In the other method, the image data within the range of the object division level are left unchanged; and the image data outside the range of the object division level are given "0."

The specific number n may be fixed or it may be so configured that the user can change the number depending on the purpose.

The means for calculation of re-allocation value by levels is made to carry forward the error—from n leveling of the re-allocation value at the position of the object pixel—to add to the sum of the re-allocation values on one of the division levels in the ensuing reallocation process. The one of the division levels is preferably the maximum level.

In case the first level division means is used, calculation of allocation values and reallocation process are all effected in the different scanning windows for different levels, while multi-leveling is performed on the sum of object pixels on the respective levels. In this case, therefore, the multi-leveling means (first multi-leveling means) works out the sum of pixels on respective levels. In case the second level division means is used, on the other hand, it is so configured that the sum of object pixels on the respective levels is obtained by level synthesis means in the step before the second level division means. In this case, therefore, the multi-leveling means (second multi-leveling means) utilizes the sum of object pixels on the respective levels obtained by the level synthesis means.

The prior art method in which re-allocation is effected without level division blurs letters and line drawings in the edge, but the method is convenient for reproduction of half tone because smoothing is automatically effected. If a method using re-allocation values divided by levels as described above is used in combination with a method using allocation values without level division, reproduced letters and line drawings will be clear while the reproduction of half tone will be optimized. It can be so configured, therefore, that selection means is provided which permits switching between the two methods.

In either of the configurations, if ranking correction means is used, the ranking by the ranking means (second ranking means) can be corrected. That permits selection of proper ranking according to the picture quality desired and the user's need.

BRIEF DESCRIPTION OF THE DRAWINGS

Further aspects and advantages of the invention will be more apparent from the following description taken together with the accompanying drawings, in which:

FIG. 2 is a concrete, explanatory diagram of the image processing apparatus of the present invention.

FIG. 16 is a concrete, explanatory diagram of the image processing method of the present invention.

FIG. 22 is an explanatory diagram of the prior art multi-level correlative density assignment of adjacent method.

FIG. 23 is an explanatory diagram of the problem with the prior art multi-level correlative density assignment of adjacent method.

DESCRIPTION OF THE PREFERRED EMBODIMENTS

Figure 1:
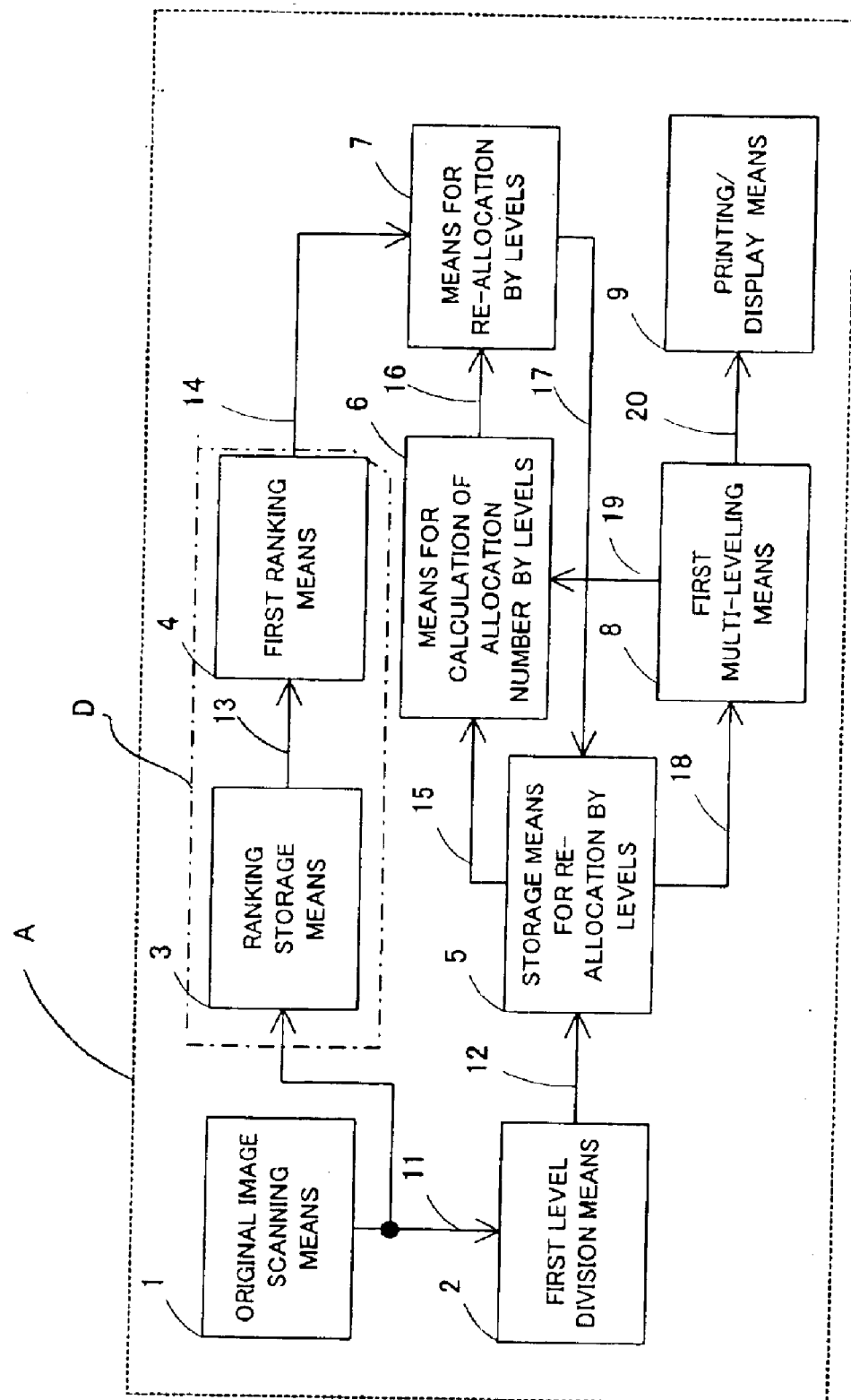
FIG. 1 is a block diagram showing an image processing apparatus of a first embodiment of the present invention.

Now, the embodiments of the present invention will be described with reference to the drawings.

(Principle)

FIG. 2 shows a process flow of the principle of the present invention.

Let it be assumed that image data of which the scanning window (a frame formed of the object pixel and specific adjacent pixels including inputted pixel) is a three-row, three-column scanning window and image data with a 256 gradation from 0 to 255 are quantized into four-leveled. Then, the four-leveled will be {0, 85, 170, 255}.

If the original image data in the scanning window stored in ranking storage means 3 is as shown in FIG. 2(a), the ranking in decreasing order of the values of pixels is as shown in FIG. 2(b). It is noted that the object pixel is a value "40" in the first row, first column. The input pixel data to be newly inputted by scanning is a value "210" in the third row, third column. The re-allocated values in the scanning window before the processing is shown in FIG. 2(c). Data other than those in the third row, third column are values already re-allocated in the preceding processing. For example, therefore, the object pixel "40" in FIG. 2(a) is "10" in FIG. 2(c). This means that values have been changed a number of times in re-allocation processing.

First, the re-allocated values including input image data in the scanning window (re-allocated image data) are divided into three levels: the first range from "0" to "85," the second range from 86" to "170" and the third range "171" to "255" (hereinafter referred to as the first division level, second division level and third division level; the value to represent the divided gradation range (in this case, "85") shall be called gradation unit). The values obtained when the re-allocated values are divided at the respective division levels are shown in FIGS. 2(d), (e) and (f). That is, data in FIG. 2(d) is image data obtained when the values in the first division level are extracted from data in FIG. 2(c). Data in FIG. 2(e) is image data obtained when the values in the second division level are extracted from the remainder in FIG. 2(c). Data in FIG. 2(f) is image data obtained when the values in the third division level are extracted from the remainders in FIG. 2(c). Therefore, if the values at the respective pixels of the respective division levels are added up, the result will be equal to the sum of the re-allocated values in FIG. 2(c).

The re-allocation values at the respective division levels are added up and the result is divided by the maximum value obtainable in the division levels (in case of four-leveled data, gradation unit "85"). The results are re-allocated according to the rank order. The data thus obtained are as shown in FIGS. 2(g), (h) and (i). FIG. 2(g) shows re-allocated values for the first division level. FIG. 2(h) shows re-allocated values for the second division level. FIG. 2(i) shows re-allocated values for the third division level. Take FIG. 2(g) for instance. If the image data of all the pixels in FIG. 2(d) are added up, the result is "605." The result divided by the gradation unit "85" gives "7" and leaves "10." Therefore, 7 "85"s are allocated in decreasing rank order, with the residual "10" allocated in the 8th pixel and "0" in the ninth pixel.

If the respective values shown in FIGS. 2(g), (h) and (i) are added up, the re-allocation values as shown in 2(j) can be obtained. It is noted that the multi-leveling error in the processing just before is assumed to be "0".

According to the preceding method, re allocation is performed in the same division level—processing to obtain FIGS. 2(g), (h) and (i) from FIGS. 2(d), (e) and (f)—, and therefore, letters etc. will not blur so much.

Embodiment 1

The procedure described above is carried out in FIG. 1. The outline of the circuit in FIG. 1 will be described.

Figure 3:
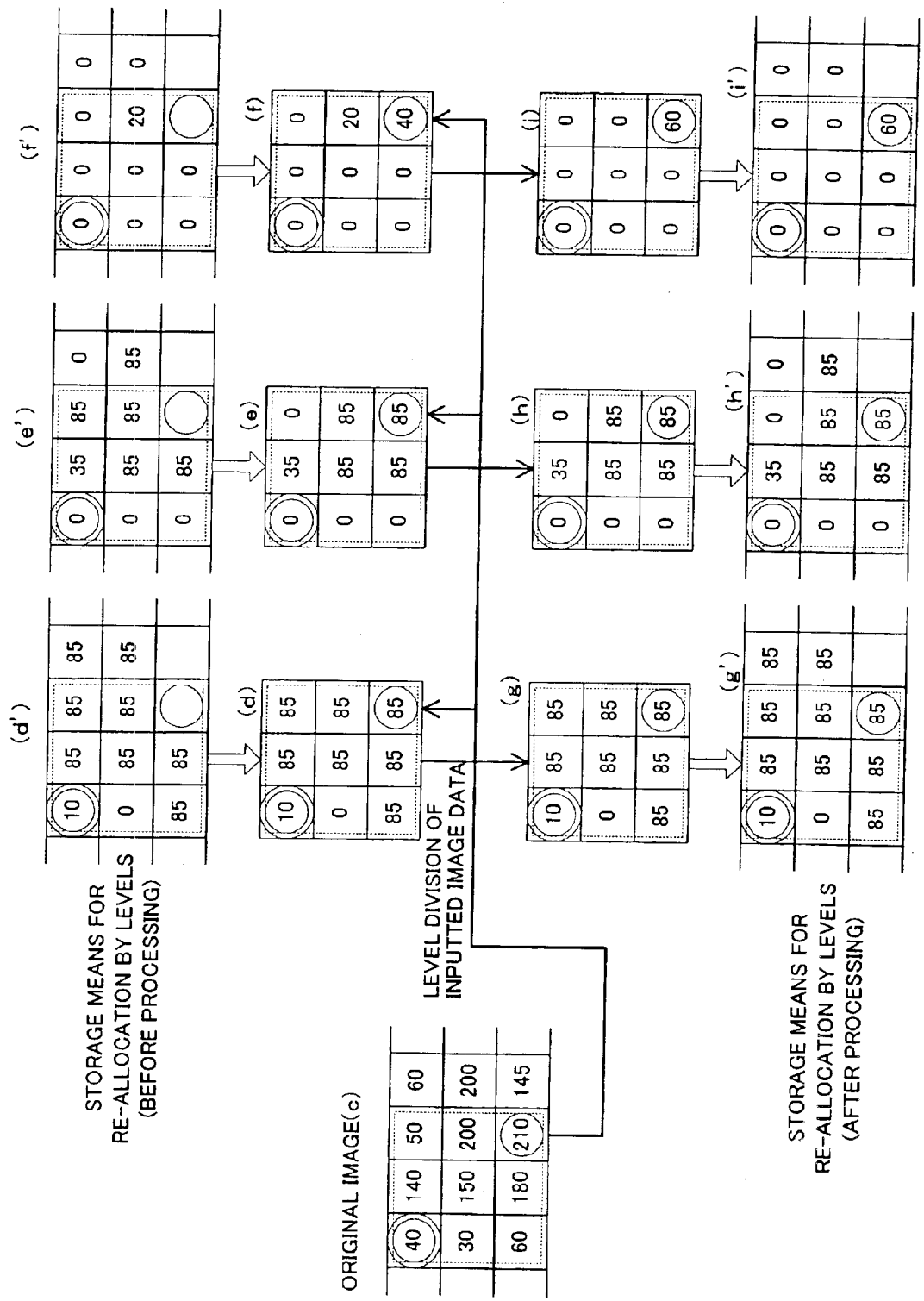
FIG. 3 is a flow chart showing the processing procedure of the first embodiment of the present invention.

Original image scanning means 1 scans the original image and inputs inputted pixel image data 11 (in this case, "210") to first level division means 2. Acquiring inputted pixel image data 11, first level division means 2 divides the inputted pixel image data 11 into the respective levels (from FIG. 3(c) to the respective division levels in FIGS. 3(d), (e) and (f)). The image data 12 thus divided are inputted into storage means 5 for re-allocation by levels. In addition to the above-mentioned re-allocated inputted pixels, this storage means 5 for re-allocation by levels has already stored image data of the respective pixels in the scanning windows by levels (frame indicated in dotted line in FIG. 3) at the respective levels (FIGS. 3(d'), (e') and (f)). In the positions for input image in the scanning windows, image data, with the input pixel divided in the respective levels, are to be written (FIGS. 3(d), (e) and (f)). This processing corresponds to the procedure from FIG. 2 (c) to FIGS. 2(d), (e) and (f).

Meanwhile, inputted pixel image data 11 is stored in ranking storage means 3, too. Of the inputted pixel image data 11 stored in the ranking storage means 3, the image data 13 within the scanning windows are ranked by first ranking means 4.

Means 6 for calculation of allocation number by levels finds the sum of re-allocated values at the respective levels (including the aforesaid inputted image), and divides the found sum by the maximum value within the division level to find allocation number 16N and residual 16A. In the case of the maximum level, the multi-leveling error 19 (see FIG. 1, FIG. 8: first multi-leveling means) outputted from first multi-leveling means 8 is added to the sum for obtaining the allocation number and residual. Means 7 for re-allocation by levels re-allocates the maximum values within the respective division levels (in this case, "85") according to the rank order obtained from first ranking means 4—only in the allocation number obtained by means 6 for calculation of allocation number by levels. In addition, means 7 for re-allocation by levels allocates the residuals and "0" and stores them in storage means 5 for re-allocation by levels (FIG. 3(*g*), (*h*), (*i*)→FIGS. 3 (*g'*), (*h'*), (*i'*)). This processing corresponds to the procedure from (FIG. 2(*d*), (*e*), (*f*)→FIG. 3(*g*), (*h*), (*i*)).

First multi-leveling means 8 adds up the re-allocation values at the respective levels for the object pixel stored in storage means 5 for re-allocation by levels and multi-valuates the result. Furthermore, first multi-leveling means 8 outputs multi-leveling error 19 to means 6 for calculation of allocation number by levels. It is so configured that multi-leveled data 20 is outputted to print/display means 9 for recording or display.

In the present embodiment, it is understood that as mentioned above, the input image levels are 0 to 255 and the multi-value levels are four-leveled {0, 85, 170, 255}. In the following description, it is understood that the scanning window is formed of 2 columns and 2 rows. The same is applicable to the other embodiments.

Figure 4:
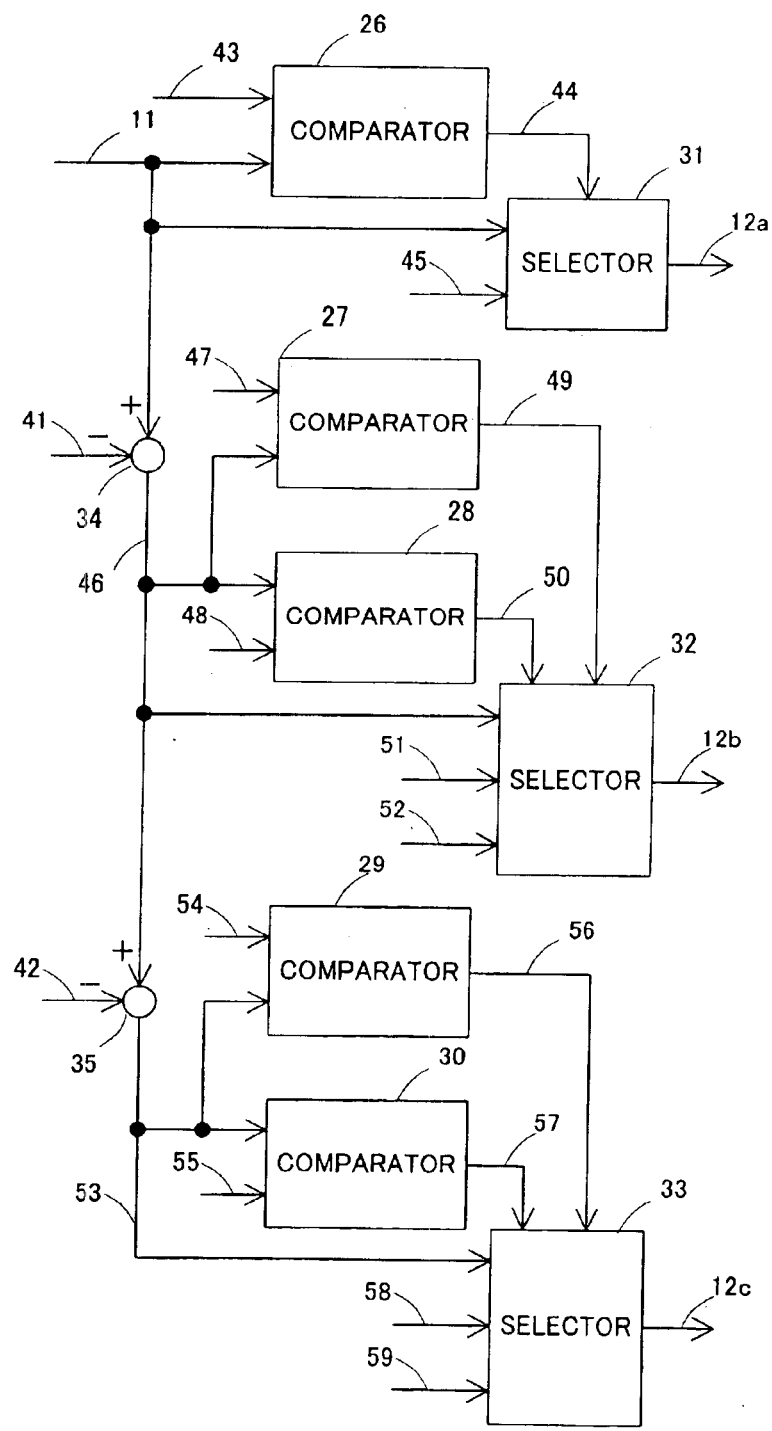
FIG. 4 is a block diagram of a first level division circuit as embodiment of first level division means.

FIG. 4 is a block diagram of a first level division circuit as embodiment of first level division means 2.
@@9/7

Input pixel image data 11 outputted from original image scanning means 1 is first inputted to a comparator 26 where the data is compared with gradation unit "85" (signal line 43), and the comparison results 44 are inputted to a selector 31. On the basis of the comparison results 44, selector 31 outputs inputted pixel image data 11 or "85" (signal line 45) as first division level data 12*a*. That is, in case input pixel image data 11 is smaller than value "85", selector 31 outputs inputted pixel image data 11. In case input pixel image data 11 is larger than value "85", selector 31 outputs "85". The signals outputted from the selector 31 become first division level data 12*a*.

Input pixel image data 11 is also inputted to a subtracter 34 where value "85" (signal line 41) is subtracted from the inputted pixel image data 11. The obtained image data 46 is inputted to a comparator 27 and a comparator 28. In the comparator 27, the image data 46 and "0" (signal line 47) are compared. In the comparator 28, the image data 46 and value "85" (signal line 48) are compared. The respective comparison results 49 and 50 are inputted to selector 32. If the value of image data 46 is smaller than "0", selector 32 outputs value "0" (signal line 51). In case the value is not smaller than value "0" and not larger than "85", selector 32 outputs the image data 46 as it is. In case the value is not smaller than "85", then selector 32 outputs value "85" (signal line 52). The signals outputted from the selector 32 become second division level data 12*b*.

Image data 46 is likewise inputted to a subtracter 35. The subtracter 35 subtracts value "85" (signal line 42) from the image data 46. The image data 53 thus obtained is inputted to comparators 29 and 30 where value "0" (signal line 54) and value "85" (signal line 55) are likewise compared. The results 56 and 57 are inputted to a selector 33. The selector 33 processes them the same way as selector 32 and outputs third division level data 12*c*.

Figure 5:
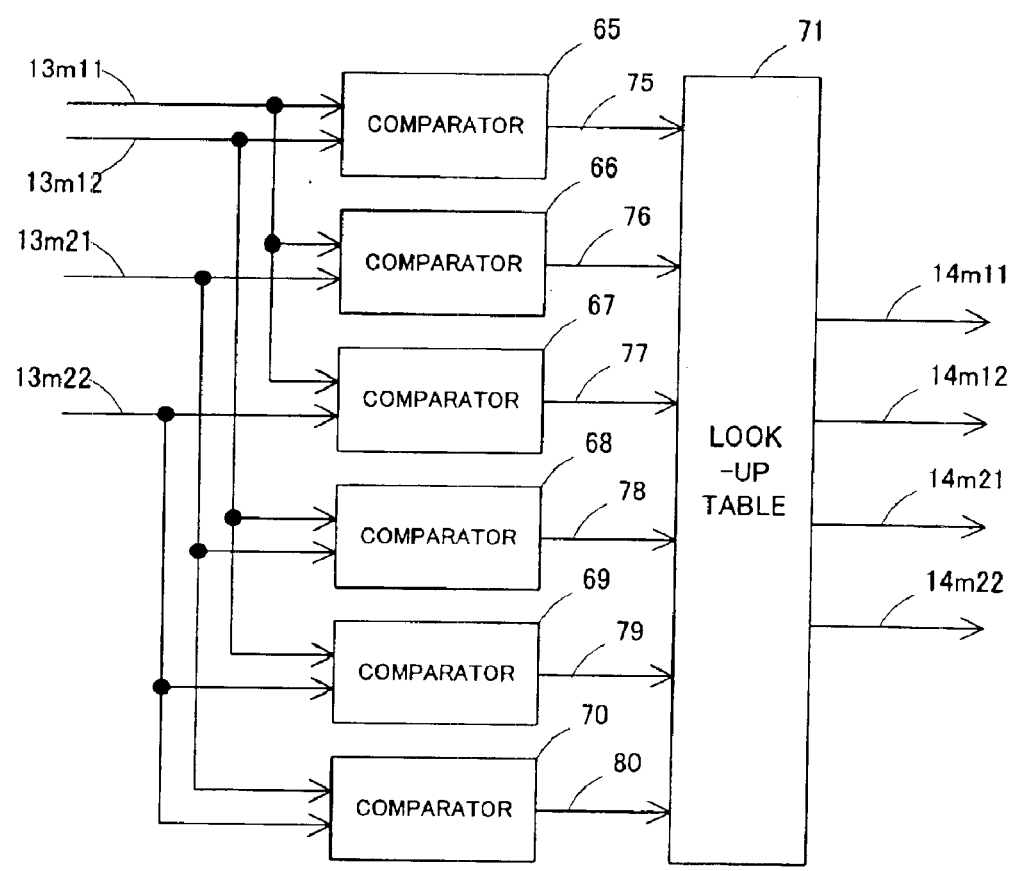
FIG. 5 is a block diagram of a first ranking circuit as embodiment of the first ranking means.

FIG. 5 is a block diagram of a first ranking circuit as embodiment of the first ranking means 4.

Image data 13*m*11 in the first row, first column, image data 13*m*12 in the first row, second column, image data 13*m*21 in the second row, first column and image data 13*m*22 in the second row, second column outputted from the ranking storage means 3 are compared two by two in comparators 65 to 70, and the comparison results 75 to 80 are inputted to a look-up table 71. The comparison results 75 to 80 exhibit specific patterns "0" "1" according to the large-and-small relationship of the respective pixels, and look-up table 71 stores the relation between the "0" "1" patterns and the rank order of the respective pixels. Thereby, look-up table 71 outputs rank 14*m*11 for image data in the first row, first column, rank 14*m*12 for image data in the first row, second column, rank 14*m*21 for image data in the second row, first column, and rank 14*m*22 for image data in the second row, second column on the basis of the comparison results. In this case, it is noted, the values are arranged starting with the highest ranking position value like this: "0", "1", "2" . . . .

Figure 6:
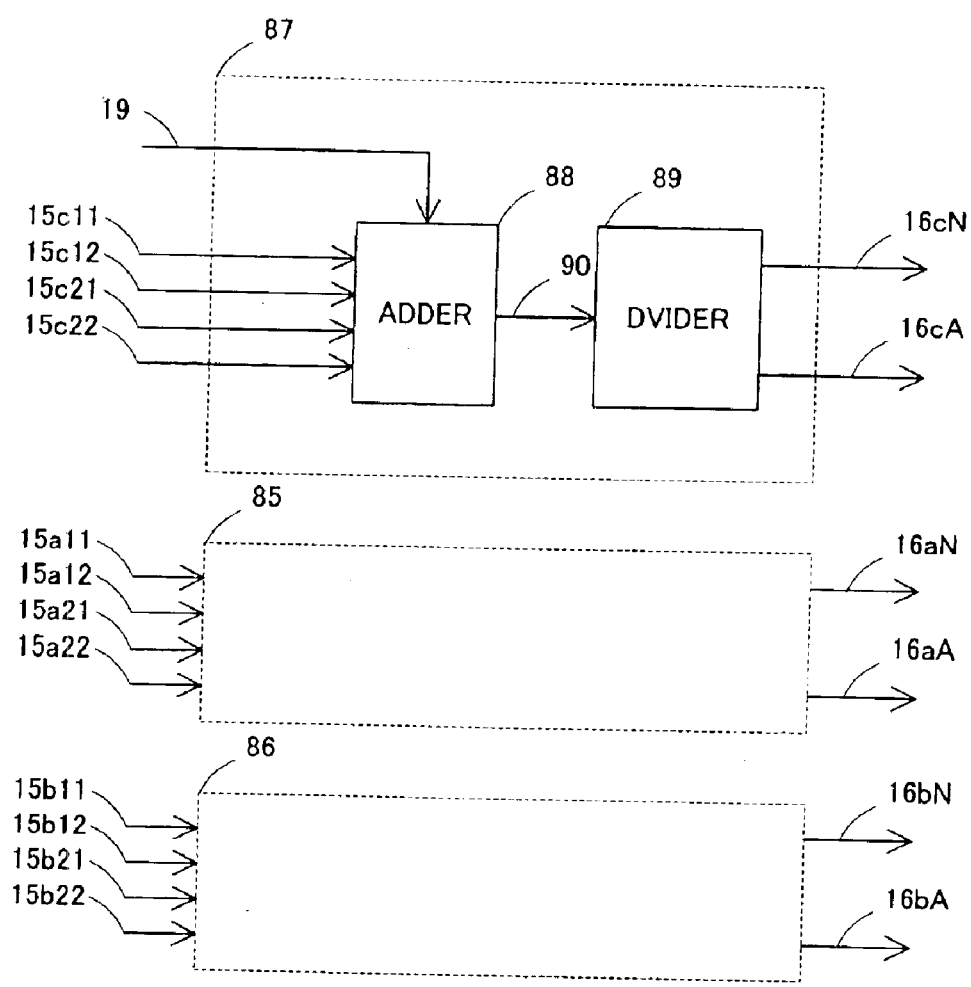
FIG. 6 is a block diagram of a circuit for calculation of allocation values by levels.

FIG. 6 is a block diagram of a circuit for calculation of allocation values by levels as embodiment of means 6 for calculation of allocation values by levels.

The means 6 for calculation of allocation values by levels is formed of circuits 85, 86, and 87 for calculation by division levels for the first, second and third levels. And the respective circuits for calculation by division levels have each an adder 88 and divider 89 as component. It is noted that circuit 85 for calculation by division levels for the first division level and circuit 86 for calculation by division levels for the second division level are different from circuit 87 for calculation by division levels for the third division level, and the only difference is whether the multi-leveling error 19 just before is added or not. Now, there will be explained circuit 87 for calculation by division levels for the third level in which multi-leveling error 19 is added.

Re-allocation value 15*c*11 in the first row, first column, re-allocation value 15*c*12 in the first row, second column, re-allocation value 15*c*21 in the second row, first column, re-allocation value 15*c*22 in the second row, second column, all of the third level outputted from the storage means 5 for re-allocation by levels, and multi-leveling error 19 are added up by adder 88. The addition result 90 is divided by gradation unit "85" at divider 89. The divider 89 outputs the division results, that is, allocation number 16*c*N and residual 16*c*A. Likewise, circuit 85 for calculation by division levels for the first division level outputs allocation number 16*a*N and residual 16*a*A. And circuit 86 for calculation by division levels for the second division level outputs allocation number 16*b*N and residual 16*b*A.

Figure 7:
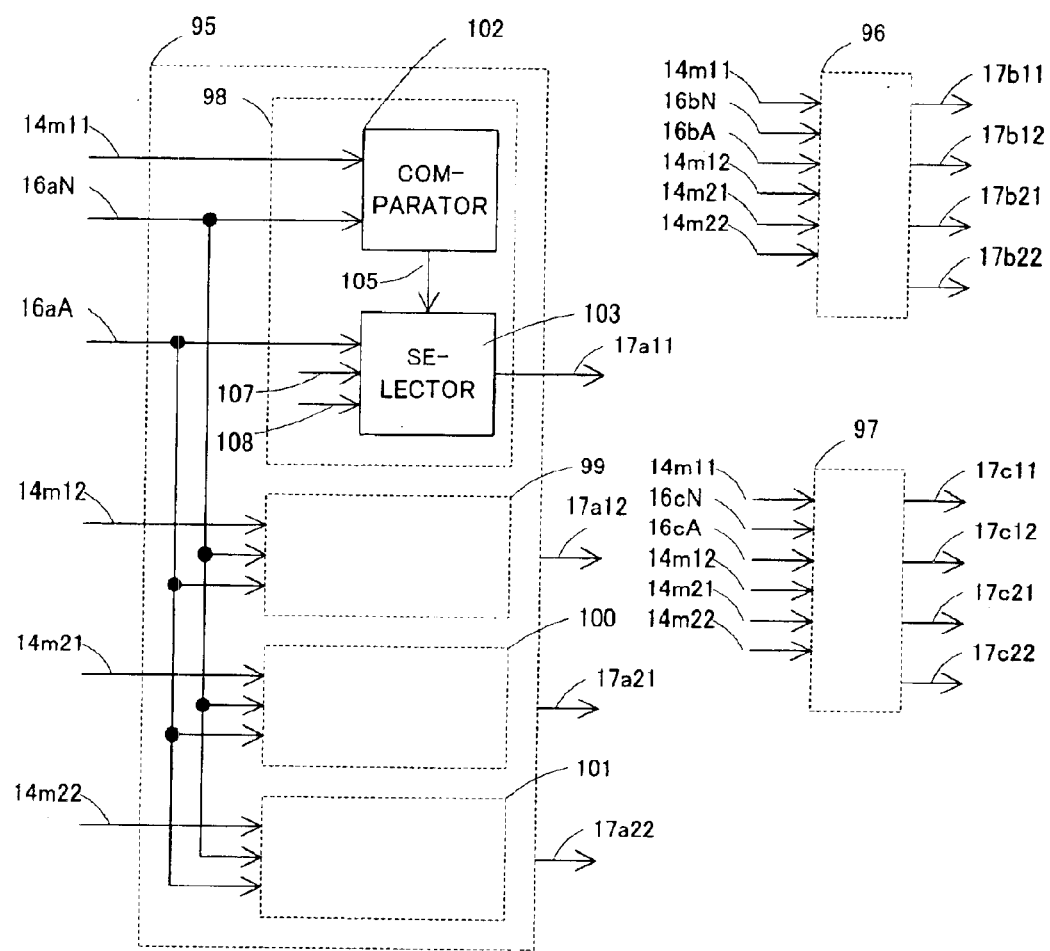
FIG. 7 is a block diagram of a circuit for re-allocation by levels as embodiment of means for re-allocation by levels.

FIG. 7 is a block diagram of a circuit for re-allocation by levels as embodiment of means 7 for re-allocation by levels. The circuits for calculation by division levels are circuits 95, 96 and 97 for re-allocation by levels for the respective division levels. The respective circuits 95, 96 and 97 for re-allocation by levels have each circuit 98, 99, 100, and 101 for re-allocation by elements as component. Furthermore, circuit 98 for re-allocation by elements is provided with a comparator 102 and a selector 103.

Now, there will be explained circuit 98 for re-allocation by elements which decides on the re-allocation value of the element in the first row, first column of the circuit 95 for re-allocation by levels for the first level. For other division levels, means 7 for re-allocation by levels can be constituted using the same circuits. The rank 14*m*11 in the first row, first column outputted from first ranking means 4 is compared at comparator 102 with allocation number 16*a*N outputted from means 6 for calculation of allocation values by levels. The comparison results 105 are inputted to selector 103, and on the basis of the comparison results, residual 16*a*A of the first division level—value "0" (signal line signal line 107) or value "85" (signal line 108)—is selected. In case the rank 14*m*11 (rank order starting with value "0") is smaller than allocation number 16*a*N, the selector 103 selects "85". In case the rank 14*m*11 is equal to allocation number 16*a*N the selector 103 selects residual 16*a*A. In case the rank 14*m*11 is larger than allocation number 16*a*N, the selector 103 selects "0". The value is outputted as re-allocation value 17*a*11 in the first row, first column of the first division level.

Similarly, re-allocation value 17*a*12 in the first row, second column, re-allocation value 17*a*21 in the second row, first column and re-allocation value 17*a*22 in the second row, second column, all of the first division level, are outputted from circuit 95 for re-allocation by levels. For the other division levels, re-allocation values of the respective factors of the respective division levels are outputted.

Figure 8:
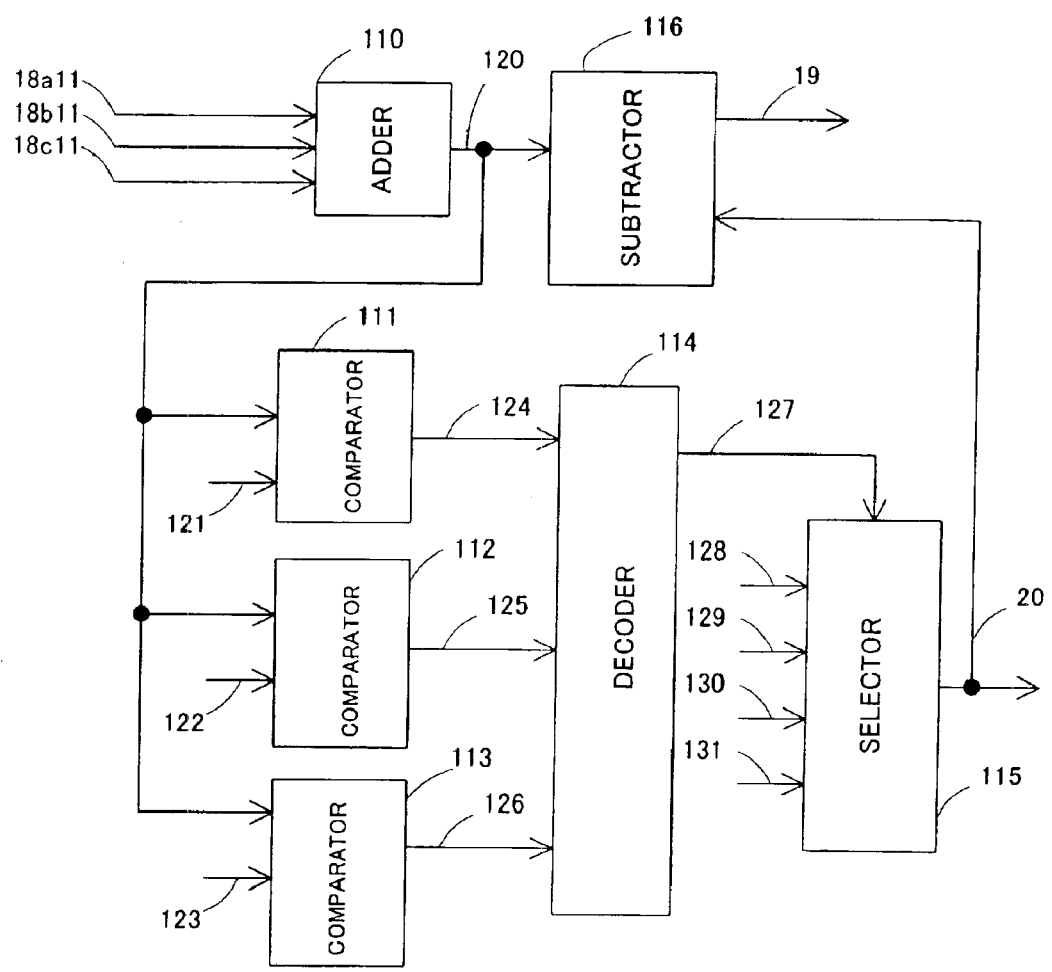
FIG. 8 is a block diagram of a first multi-leveling circuit as embodiment of first multi-leveling means.

FIG. 8 is a block diagram of a first multi-leveling circuit as embodiment of first multi-leveling means 8. The first multi-leveling circuit comprises an adder 110, comparators 111 to 113, decoder 114, selector 115 and subtracter 116.

Re-allocation value 18*a*11 in the first row, first column of the first division level, re-allocation value 18*b*11 in the first row, first column of the second division level and re-allocation value 18*c*11 in the first row, first column of the third division level, all obtained from the storage means 5 for re-allocation by levels, that is, the re allocation values of the respective levels for the object pixel are added up by adder 110 and inputted to comparators 111 to 113. The comparator 111 compares the first threshold value "43" (signal line 121) or ½ of value "85" and the added re-allocation value 120 in the first row, first column (object pixel), and outputs comparison results 124 to decoder 114. The comparator 112 compares a threshold value "128" (signal line 122) or ⅖ of value "85" and re-allocation value 120. The comparator 113 compares a threshold value "213" or ⅗ of the value "85" and re-allocation value 120. The results 125, 126 are outputted to decoder 114. From the results, the decoder 114 generates selection signal 127. This selector selects one of four-leveled (128 to 131), that is "0", "85", "170", "255" and outputs it as multi-leveled data 20.

In other words, it is so configured that in case re-allocation value 120 is not smaller than "0" and smaller than a threshold value "43", value "0" (128) is selected; in case re-allocation value 120 is not smaller than threshold value "43" and smaller than threshold value "128", value "85" (129) is selected; in case re-allocation value 120 is not smaller than threshold value "128" and smaller than threshold value "213", value "170" (130) is selected; and in case re-allocation value 120 is not smaller than threshold value "213", value "255" (131) is selected. The selected values are then outputted from selector 115.

The subtracter 116 subtracts multi-leveled data 20 from re-allocation value 120 and generates multi-leveling error 19.

It is noted that the four-leveled are not limited to {0, 85, 170, 255} but may be {0, 1, 2, 3}, for example. But though not shown, multi-leveling error 19 has to be 256-leveled image data because it is used in the means 6 for calculation of allocation values by levels. This is also applicable to second multi-leveling means, which will be described later.

As set forth above, according to the image processing apparatus shown in the first embodiment, the original data is divided in levels and re-allocated, densities are allocated across the division levels (except for multi-leveled error). For this reason, letters and line drawings hardly blur and thus high-quality multi-leveled image can be reproduced.

Embodiment 2

Figure 9:
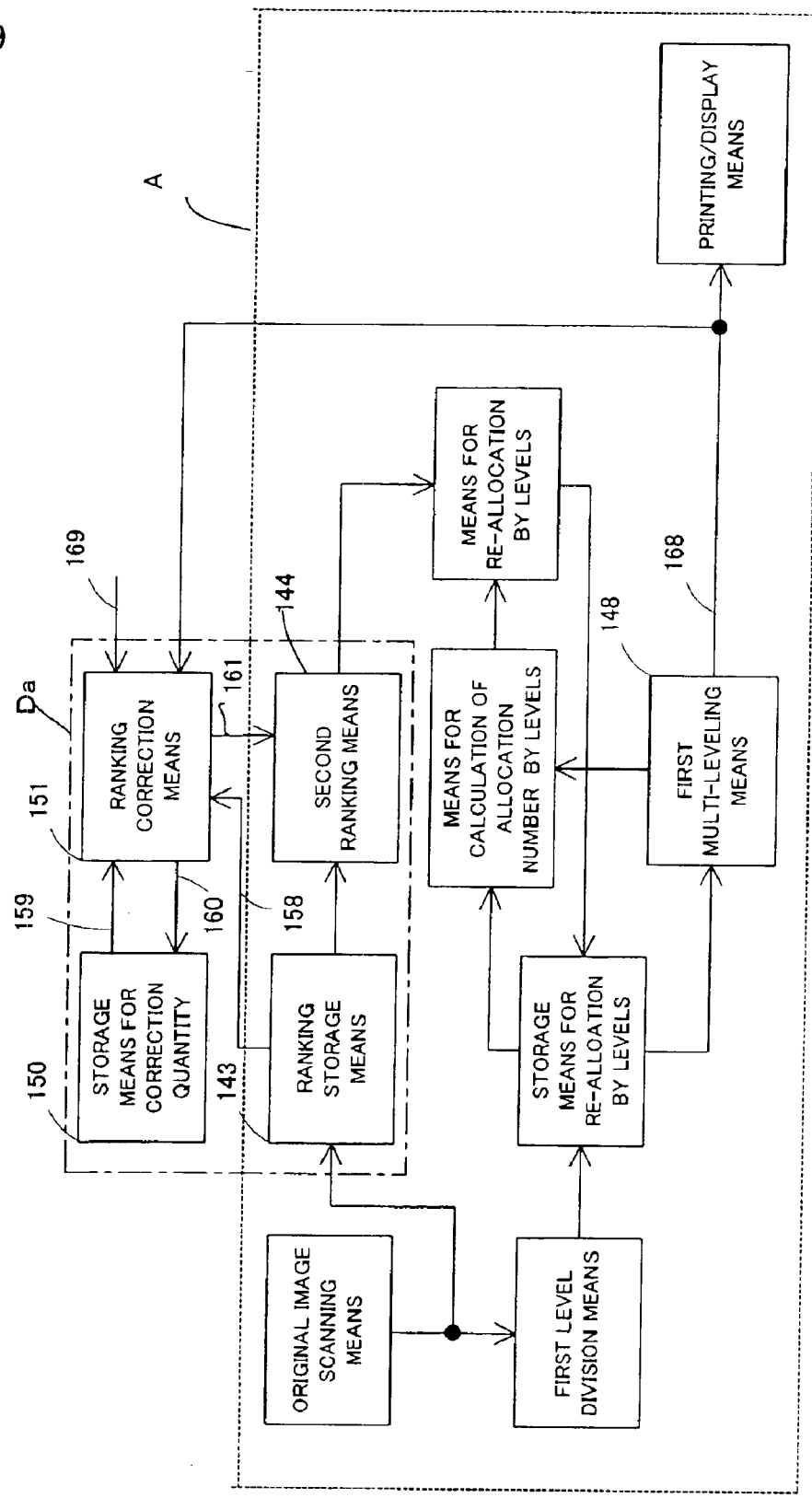
FIG. 9 is a block diagram of an image processing apparatus of a second embodiment of the present invention.

FIG. 9 is a block diagram of an image processing apparatus of a second embodiment of the present invention.

Basic part A of the present embodiment is roughly identical with that of the first embodiment in configuration, operation and procedure. But in the second embodiment, storage means 150 for correction quantity and ranking correction means 151 are added to positioning means D shown in FIG. 1 to form positioning means Da. In addition, the first ranking means 4 shown in FIG. 1 is replaced with second ranking means 144.

The ranking correction means 151 generates neighborhood correction quantity 161 around the object pixel from ranking correction quantity 169 stored in storage means 150 for correction quantity, which will be described later, and then outputs the same to second ranking means 144. Furthermore, ranking correction means 151 newly generates ranking correction quantity 160 at the position of the object pixel using multi-leveled data 168 generated by first multi-leveling means 148, the object pixel data 158 of the original image stored in ranking storage means 143 and ranking correction quantity 159 around the object pixel.

As a result, the difference between multi-leveled data 168 and inputted pixel data 158 will be small in high-density areas such as letters and line drawings. And neighborhood correction quantity 161 will be a small value. In half-tone areas such as gravure, however, the difference is large and neighborhood correction quantity 161 becomes a large value, which has much effects on ranking. That is, ranking correction means 151 is effective in keeping down the density concentration. That can improve picture quality in such areas as half-tone part where it is desired to diffuse density.

Also, neighborhood correction quantity 161 may be controlled by external signal 169.

Figure 10:
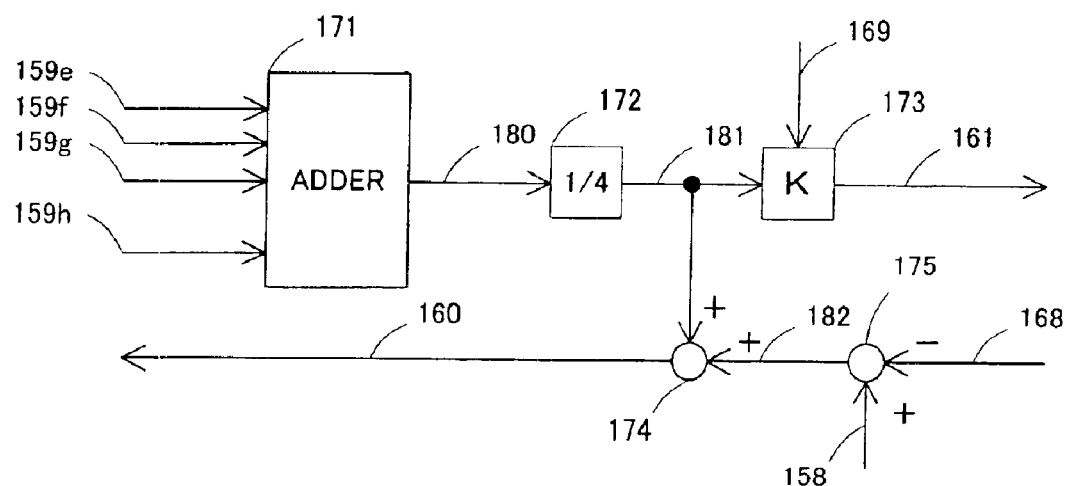
FIG. 10 is a block diagram of a ranking correction circuit as embodiment of ranking correction means.

FIG. 10 is a block diagram of a ranking correction circuit as embodiment of ranking correction means 151. The ranking correction circuit comprises subtracters 171, 174, 175, multiplier 172 and 173. Here, when the pixels at the upper left, upper, upper right and left of the position of the object pixel are adopted as adjacent pixels, ranking correction quantities 159*e*, 159*f*, 1549*g*, 159*h* at the respective adjacent pixels are read by storage means 150 for correction quantity and inputted to adder 171.

The addition result 180 from adder 171 is inputted to a multiplier 172 and multiplied by value "¼." That is, the average of the ranking correction quantities around the object pixel is worked out. Therefore, when three values at the upper left, upper and left of the object pixel are adopted as adjacent pixel, this value will be "⅓" as a matter of course (hereinafter average ranking correction quantity). The average ranking correction quantity 181 is multiplied by value K in multiplier multiplier 173, and the result value is neighborhood correction quantity 161.

Then, it is possible to control the value of neighborhood correction quantity 161 by controlling value K—by which average ranking correction quantity 181 is multiplied—by external signal 169 and to change the quantity of change of the rank order of re-allocation. Therefore, that makes it possible to control the way of dispersing the density according to the picture quality of the original data so that the picture quality is improved.

Meanwhile, multi-leveled data 168 outputted from first multi-leveling means 148 is deducted from the sum 158 of image data at the position of the object pixel of the respective division levels stored in ranking storage means 143 by subtracter 175. The difference 182 is added to average ranking correction quantity 181 by adder 174. The value thus obtained is correction quantity 160 at the position of the object pixel and stored in storage means 150 for correction quantity. Therefore, correction quantity 160 for the respective pixels is stored in storage means 150 for correction quantity.

The second ranking means 144 could be realized in almost the same circuit as the first ranking circuit as shown in FIG. 5. But the difference is that image data at the position of the object pixel (FIG. 5, 13m11) is given neighborhood correction quantity 161 obtained as mentioned above (not shown).

Embodiment 3

Figure 11:
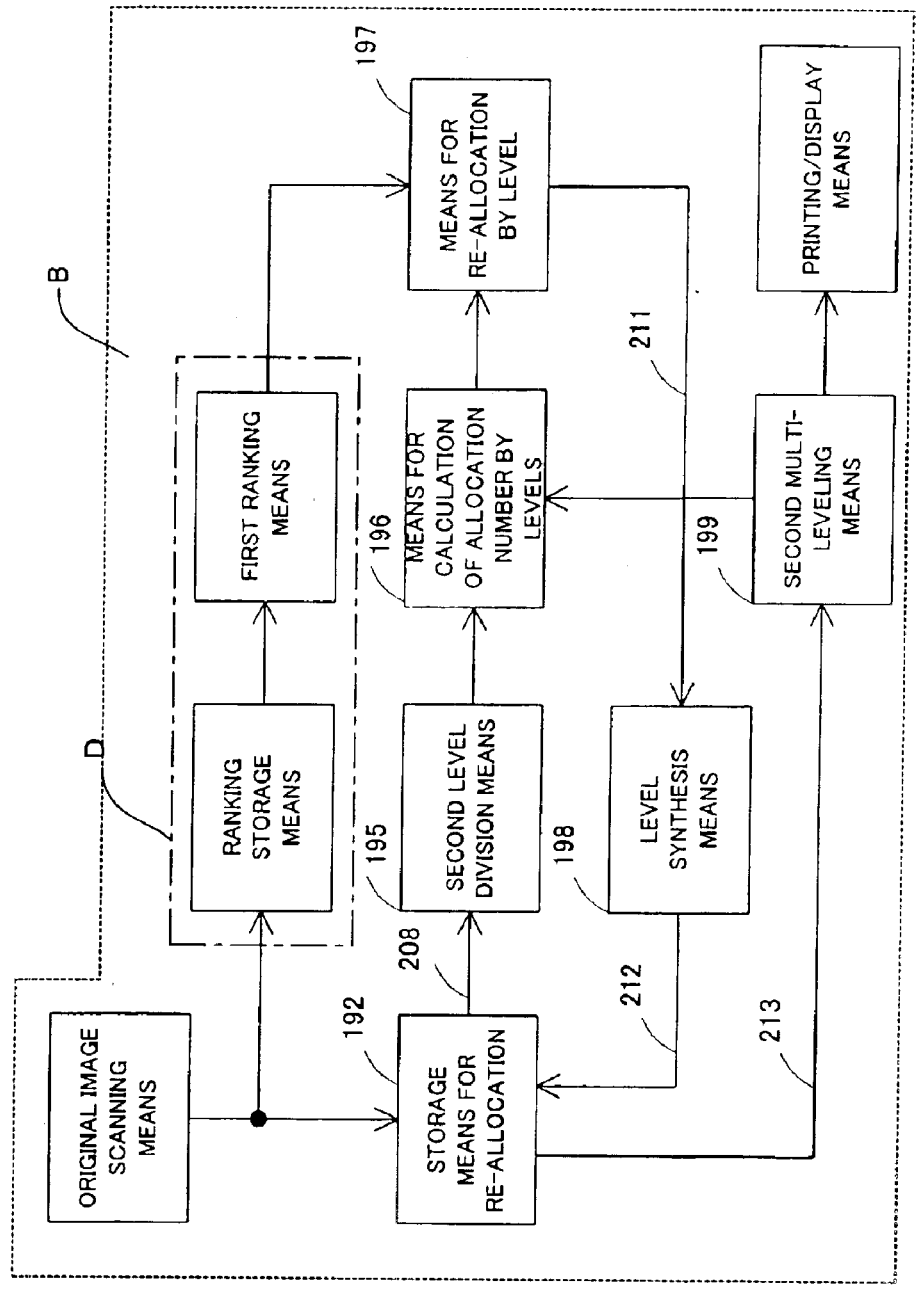
FIG. 11 is a block diagram of an image processing apparatus of a third embodiment of the present invention.

FIG. 11 is a block diagram of an image processing apparatus of a third embodiment of the present invention.

Figure 12:
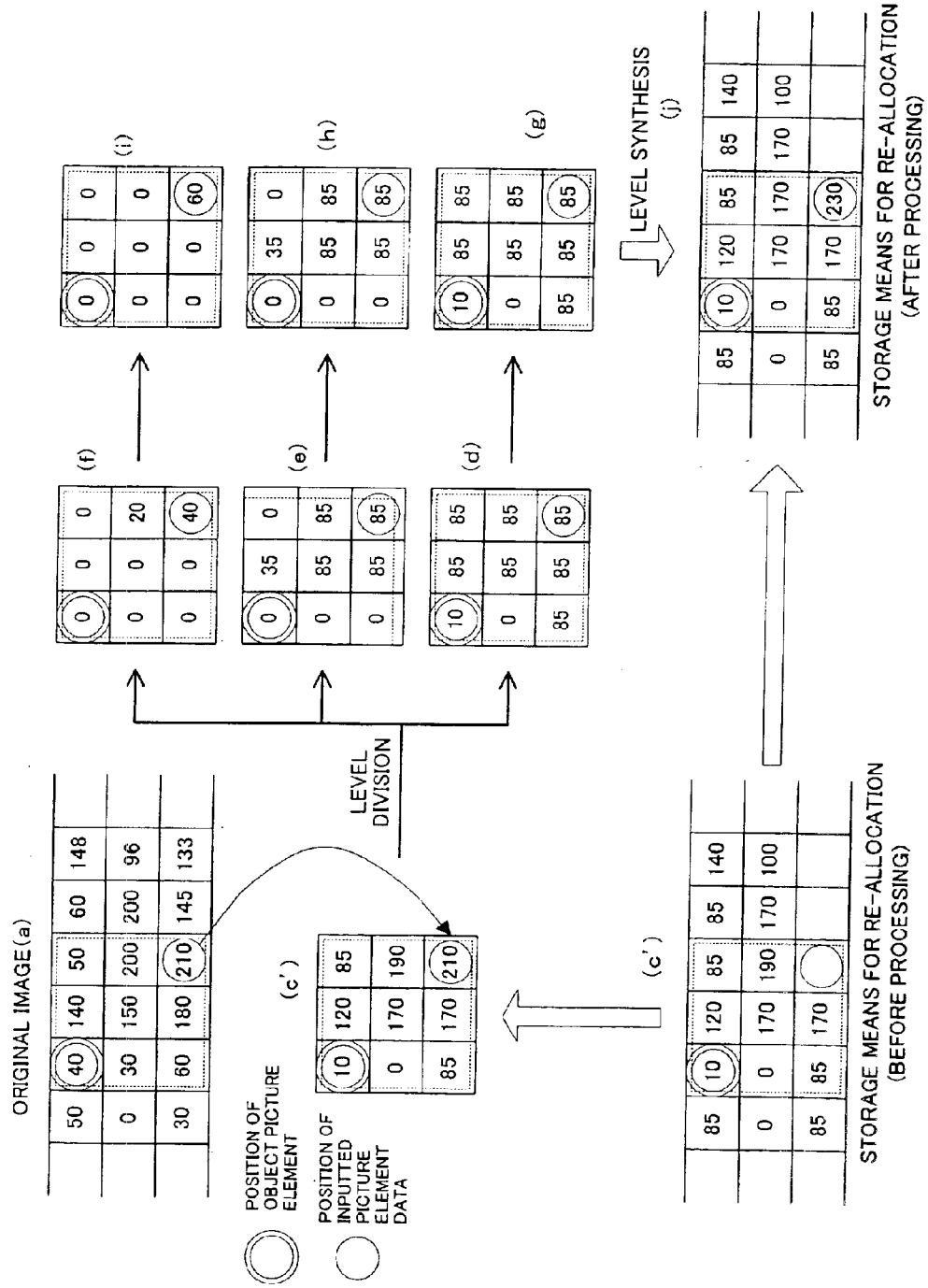
FIG. 12 is a flow sheet showing the process procedure of the embodiment.

In Embodiment 1, it is so configured that with re-allocation values by levels stored in storage means 5, the results of level division of inputted image data are written at specific positions of scanning windows at the respective levels. In the present embodiment, there is provided storage means 192 for re-allocation so that re-allocation values not divided by levels before processing are memorized (FIG. 12(c')). Input image data is written at a specific position of the scanning window (frame indicated by dotted line in FIG. 12) where the re-allocation values are re-allocated. And second level division means 195 divides by levels re-allocation values (including input image-data) before processing obtained from the storage means 192 for re-allocation (FIG. 12(d), (e) and (f)). Calculation performed by means 196 for calculation of allocation number by levels and re-allocation effected by means 197 for re-allocation by levels are the same as those in the first embodiment. But every time the newly generated re-allocation values 211 by division levels (FIG. 12(g), (h) and (i)) are synthesized by level synthesis means 198, the values obtained (FIG. 12(j)) are stored in storage means 192 for re-allocation.

Though a larger circuit is needed, that can reduce the storage capacity in storage means 192 for re-allocation to a size smaller than storage means 5 for re-allocation by levels in Embodiment 1.

Second level division means 195 can be realized with the same circuit as the first level division circuit shown in FIG. 4. In the first level division circuit, input image data only is an object for division. In second level division means 195, the respective re-allocation value data in the scanning window are an object to be divided (for example, FIG. 4(j)). Furthermore, level synthesis means 198 may be so arranged that re-allocation value 211 by division levels outputted from means 197 for re-allocation by levels are all added up for each pixel position within the scanning window (see FIG. 8, adder 110). In addition, because division level addition at the position of the object pixel is performed by level synthesis means 198, second multi-leveling means 199 can be realized without adder 110 as in the first multi-leveling circuit in FIG. 8.

Embodiment 4

In Embodiment 3, positioning means Da is created by providing ranking correction means and correction quantity storage means in the same way as in the relation between Embodiment 1 and Embodiment 2 (relation between FIG. 1 and FIG. 9). And neighborhood correction quantities corresponding to value K can be obtained and the position of the object pixel can be corrected. Furthermore, needless to say, new ranking correction quantities at the object pixel can be generated.

That adds the features of Embodiment 3 and can improve the picture quality in such areas as half tone part where it is desired to disperse density.

Embodiment 5

Figure 13:
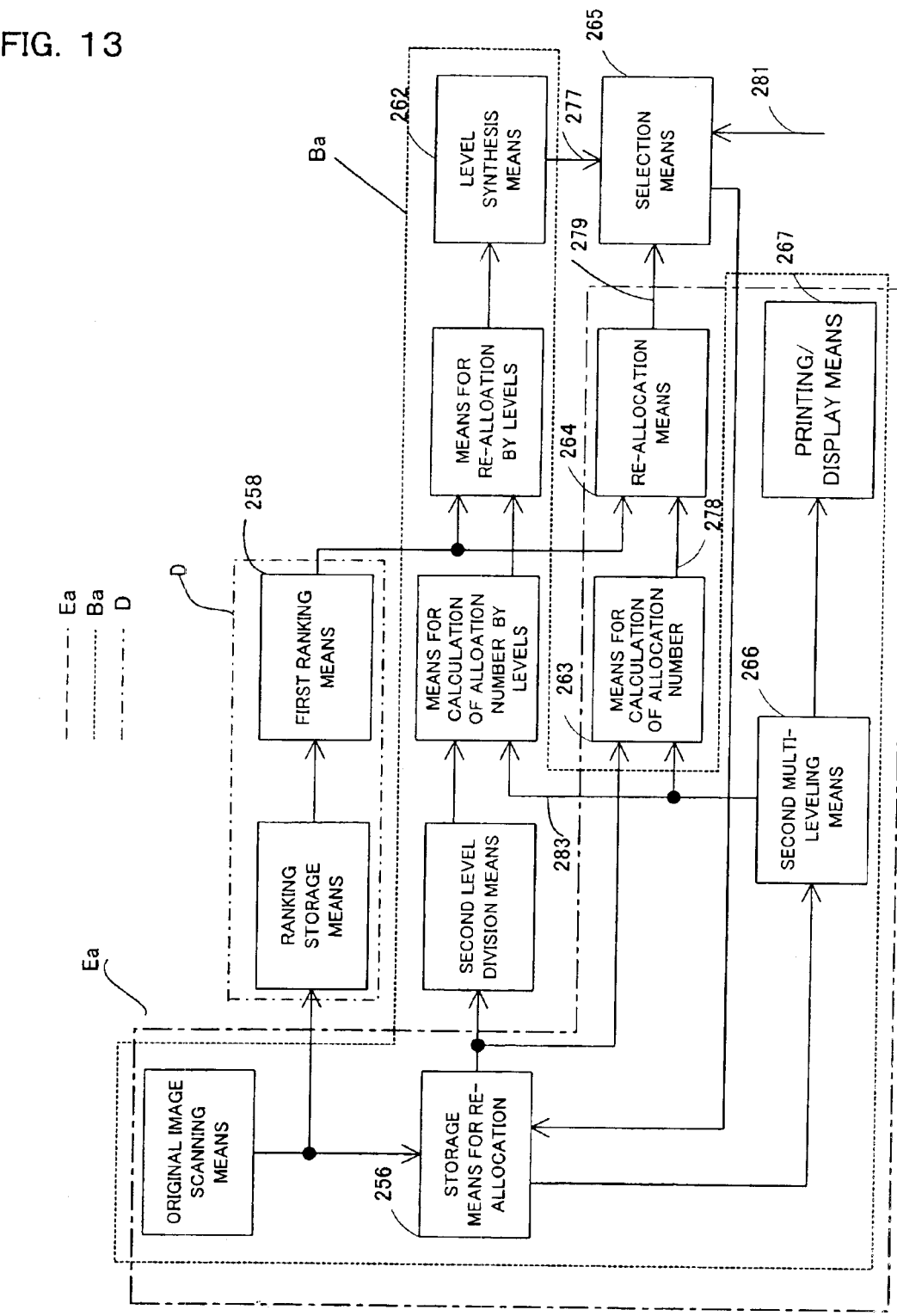
FIG. 13 is a block diagram of an image processing apparatus of a fifth embodiment of the present invention.

FIG. 13 is a block diagram of an image processing apparatus of a fifth embodiment of the present invention.

Figure 21:
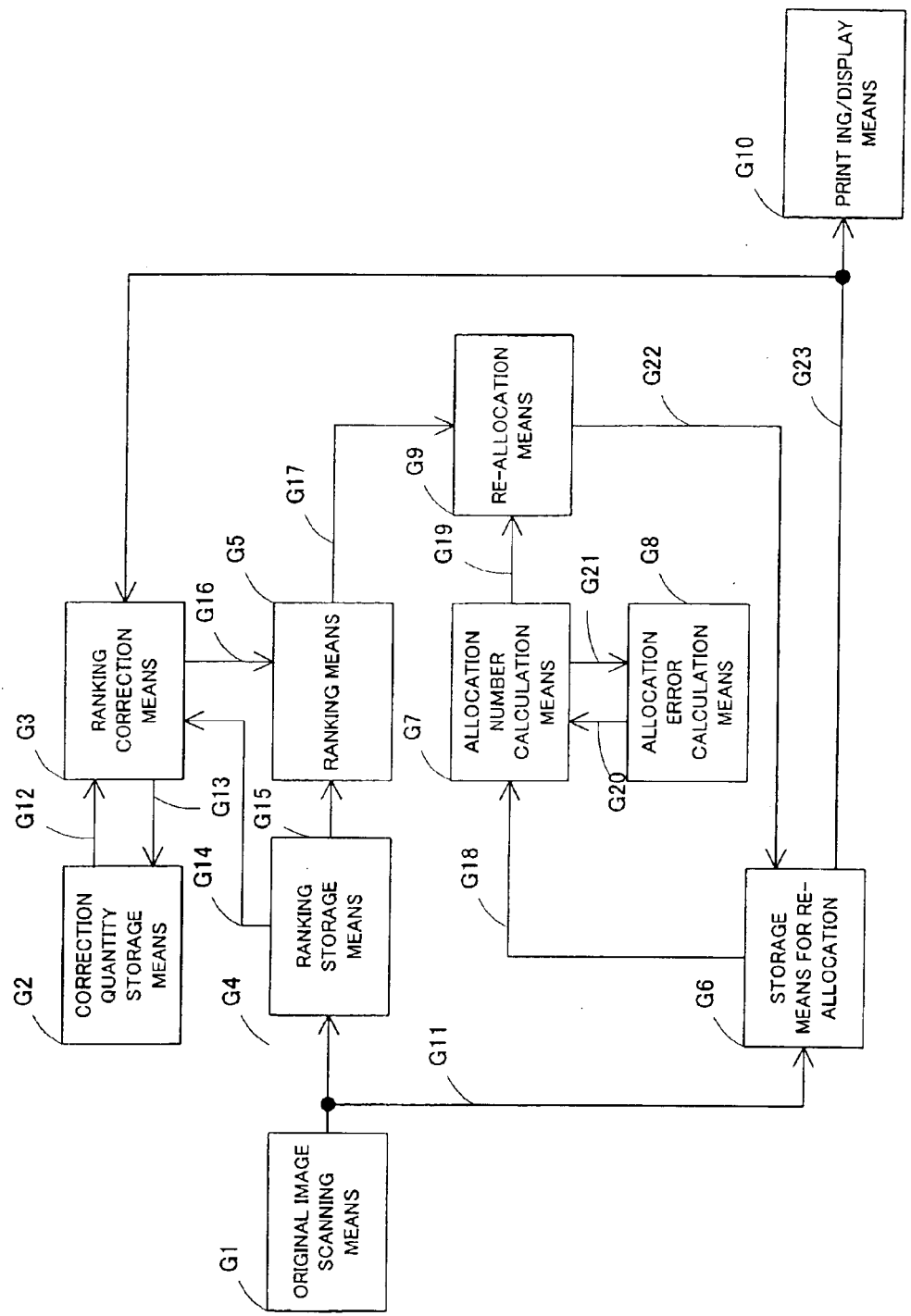
FIG. 21 is a block diagram of the prior art multi-level correlative density assignment of adjacent method.

The configuration shown in FIG. 13 comprises ranking means D, basic configuration Ba for re-allocation level with division and basic configuration Ea for re-allocation without level division. The configuration made up of the ranking means D and basic configuration Ea is similar to the prior art. But the difference is that second multi-leveling means 266 is interposed between storage means 256 for re-allocation (in FIG. 21, G6) and image print/display means 267 (in FIG. 21, G15). Furthermore, means 263 for calculation of allocation number (in FIG. 21, G7) does not use allocation errors calculated by the prior art allocation error calculation means G8. Instead, it is so configured that multi-leveling error 283 obtained from second multi-leveling means 266 is used.

According to image processing mode signal 281, selection means 265 is so adapted to select either of re-allocation value 277 obtained by level synthesis means 262 in basic configuration Ba or re-allocation value 279 obtained by re-allocation means 264 of basic configuration Ea, and then outputs it to storage means 256 for re-allocation.

In the configuration as mentioned above, in case re-allocation values are not divided by levels, the problem is that letters and line drawings blur in the edge. But its advantage is that it has a smoothing effect on half tone areas and increases smoothness of images. Therefore, if it is so arranged that whether to divide by levels (basic configuration Ba) or not to divide by levels (basic configuration Ea) can be selected by image processing mode signal 281, high picture quality can be obtained depending on inputted images.

It may be so configured that whether data are letters and line drawings or half tone areas is automatically judged and reflected in image processing mode signal 281 and selected by selection means 265.

The means 263 for calculation of allocation number can be realized with the same circuit as circuit 87 for calculation by division levels in the circuit for calculation of allocation values by levels shown in FIG. 6. In this case, re-allocation values to be inputted is data not divided by levels.

In addition, re-allocation means 264 (not shown) can be realized with about the same circuit as the circuit for re-allocation by levels shown in FIG. 7. However, since re-allocation values before division are handled, rank 14m11 in the first row, first column of the input signal in circuit 95 for re-allocation by levels become rank 272m11 in the first row, first column to be outputted from ranking means 258; rank 14m11 in the first row, first column of the input signal in circuit 96 for re-allocation by levels becomes rank 272m11 to which value "4" is added; furthermore, rank 14m11 in the first row, first column of the input signal in circuit 97 for re-allocation by levels become rank 272m11 to which value "8" is added (272m11 is not indicated in drawings). The ranks of other elements are treated the same way. That is, the rank to which value "4" is added is used in circuit 96 for re-allocation by levels, and the rank to which value "8" is added is used in circuit 97 for re-allocation by levels. In addition, allocation number 278N and residual 278A that are used as input may be the same values as in circuits 95 to 97 for re-allocation by levels. And re-allocation values outputted from circuits 95 to 97 for re-allocation by levels may be added up by elements and outputted.

Selection means 265 can be formed of selection means 265 (not shown).

Embodiment 6

In Embodiment 5, too, ranking correction means and correction quantity storage means are provided to form positioning means Da—the same way as the relation between Embodiment 1 and Embodiment 2 (relation between FIG. 1 and FIG. 9). And neighborhood quantities according to value K can be obtained, and the position of the object pixel can be corrected. Here, needless to say, new ranking correction quantities for the object pixel are generated.

Embodiment 7

Figure 14:
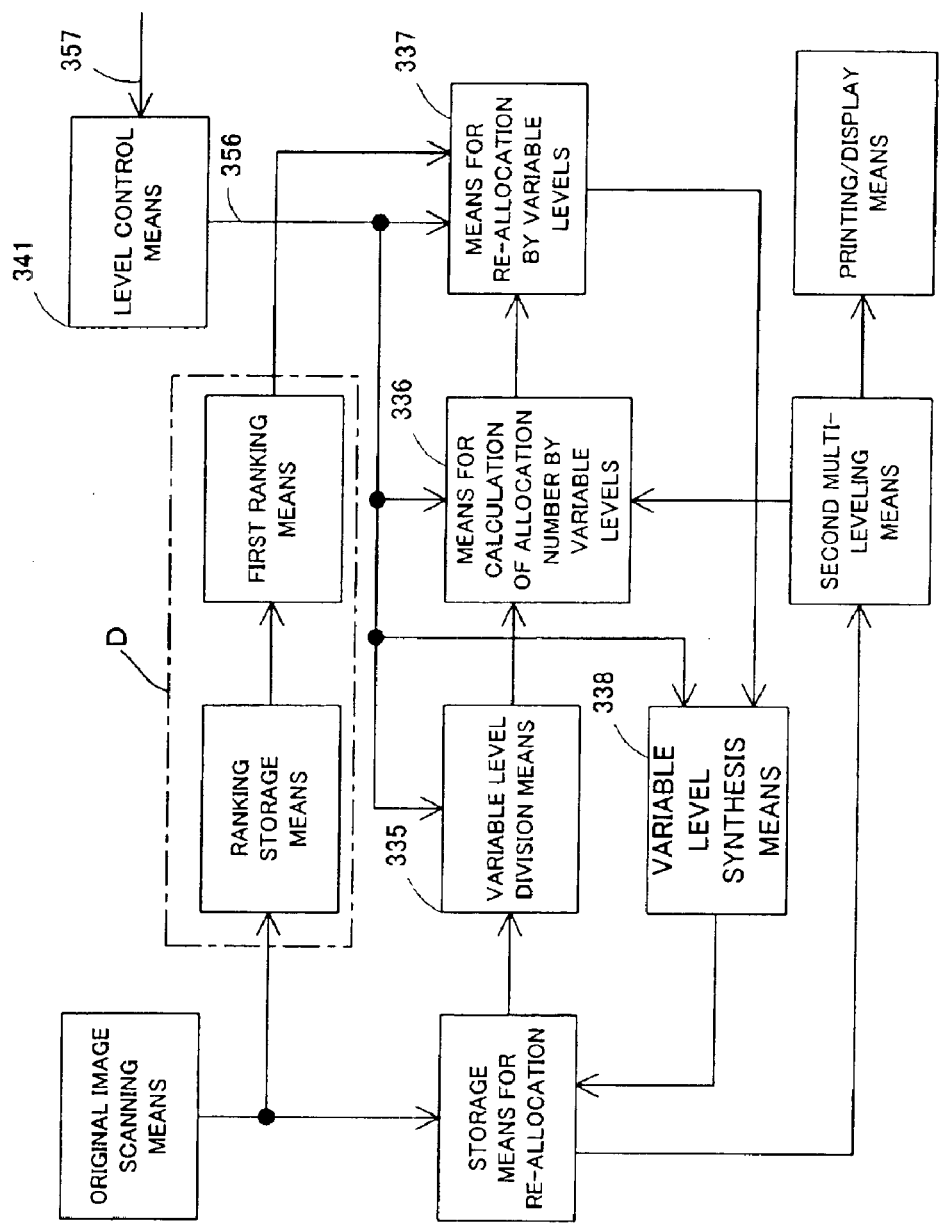
FIG. 14 is a block diagram of an image processing apparatus of a seventh embodiment of the present invention.

FIG. 14 is a block diagram of an image processing apparatus of a seventh embodiment of the present invention.

In all the preceding embodiments, the number of level divisions is fixed at n=4. In Embodiment 7, it is so configured that level control means 341 can change the number of divisions depending on the nature of prints. Level control means 341 can set division number 356 on variable level division means 335, means 336 for calculation of allocation number by variable levels, means 337 for re-allocation by variable levels and level synthesizing means 338 according to directive 357 from the user or upper-level control means. The present embodiment is exactly the same as Embodiment 4 shown in FIG. 11 in other configurations and procedures. In addition, the level control means 341 is applicable to the circuit for level division of image data of the original image shown in FIG. 1.

As explained in the description of the image processing apparatus in Embodiment 5, some images will improve in picture quality if the images are re-allocated without level division and multi-leveled as if smoothing were performed. While Embodiment 5 is so constituted that image data is re-allocated without level division, it is so arranged in the present embodiment that picture quality can be changed more minutely by making the division level number variable through control.

Though not shown, a circuit that can adapt to a plurality of division level numbers is formed of variable level division means 335, means 336 for calculation of allocation values by variable levels, means 337 for re-allocation by variable levels and means 338 for synthesis by variable levels. The number of division levels can be selected by selector on the basis of information on division number 356 from level control means 341.

Embodiment 8

In Embodiment 7, too, ranking correction means and correction quantity storage means are provided to form positioning means Da—the same way as the relation between Embodiment 1 and Embodiment 2 (relation between FIG. 1 and FIG. 9). And neighborhood quantities corresponding to value K can be obtained, and the position of the object pixel can be corrected. Here, needless to say, new ranking correction quantities for the object pixel are generated.

Embodiment 9

In Embodiments 1 to 8, the ways of embodying the present invention by hard ware have been described. The present invention can be embodied by software.

Figure 15:
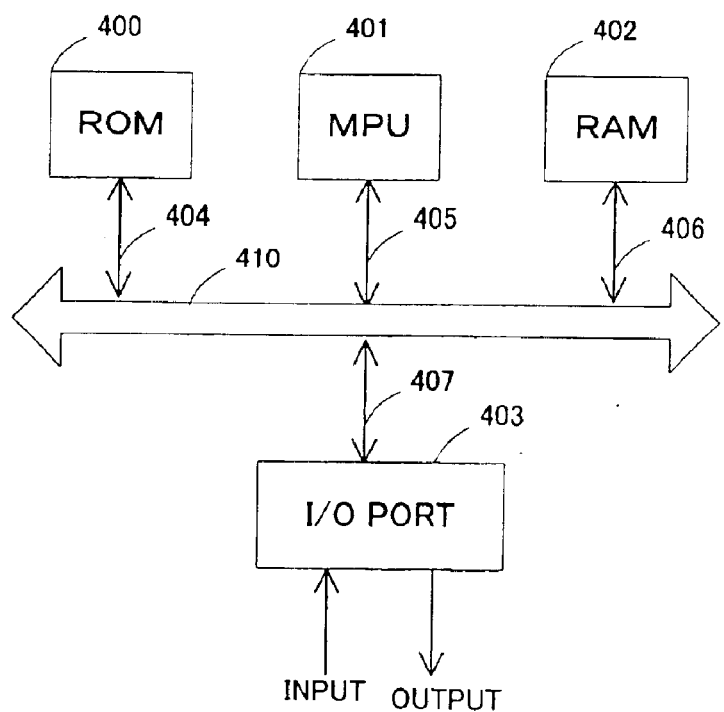
FIG. 15 is a block diagram of an MPU system to practice the image processing method.

FIG. 15 is an example of an MPU (microprocessing unit) system embodying the present invention by software. The MPU system shown in FIG. 15 comprises MPU 401, ROM (read only memory) 400, RAM (random access memory) 402 and input/output port 403. This MPU system is well known and therefore will be described briefly.

MPU 401 executes a program stored in ROM 400 using a working memory, that is, RAM 402. Input/output port 403 inputs and outputs images. Data read by the scanning image is forwarded from input/output port 403 to RAM 402 where the image is processed according to the program. Instead, a program may be forwarded from input/output port 403 to RAM 402 and executed on RAM. When the processing is over, image data is outputted through input/output port 403.

FIG. 16 is a concrete, explanatory diagram of the image processing method of the present embodiment.

If it is assumed that the original image data in the scanning window is as shown in FIG. 16(*a*), the ranking is as shown in FIG. 16(*b*). The object pixel is value "40" in the first row, first column. The data newly inputted by scanning is value "210" in the third row, third column. The re-allocation values in the scanning window before processing are shown in FIG. 16(*c*). The conditions for the explanatory diagram in FIG. 16 are the same as in FIG. 2.

In the image processing apparatuses shown in the preceding embodiments, processing can be carried out at a high speed if the respective levels are processed in parallel, and therefore, image data of the respective pixels are broken up by levels. In case soft ware is used, it will take much time if processing is done on all the division levels. It is so arranged, therefore, that values belonging to specific division levels only are picked out. That is, the values in FIG. 16(*d*) are those belonging to the first level in FIG. 16(*c*); the value in FIG. 16(*e*) are those belonging to the second level in FIG. 16(*c*); and the value in FIG. 16(*f*) are those belonging to the third level in FIG. 16(*c*). Here, levels are decided on the basis of the values in the original image. And the data of divided levels are from re-allocated data in FIG. 16(*c*). For example, if the original image is level divided, value "180" in the third row, second column in FIG. 16(*a*) will belong to the third level in FIG. 16(*f*). Therefore, value "170" in the third row, second column in FIG. 16(*c*) is allocated at the position of the corresponding pixel in the scanning window for the third level in FIG. 16(*f*).

If, after data is divided as mentioned above, image data of pixels belonging to the respective division levels are re-allocated at the positions of the pixels according to the rank order, the results will be as shown in FIG. 16(*g*), (h), (i). In FIG. 16(*h*), for example, the allocation number is "3" and the residual is "35". Value "85" is allocated to the position of the pixel of the rank 4 twice, and one value "85" and residual "35" are allocated to the position of the pixel of the rank 5. In this example, what changes is only data on the division level (third level not smaller than 170) to which the input pixel data belongs. The allocation number will be "6" and the residual "60", and value "85" is allocated in the pixels of ranks 1 to 3, each twice, and residual "60" is allocated the highest rank in the third row, third column. If the respective elements are added up, the results will be equal to the re-allocation values in FIG. 2(*j*) as shown in FIG. 16(*j*).

Multi-leveling errors from the processing just before may be added to the element on the highest division level (hereinafter maximum division level), and re-allocated on the maximum division level.

Figure 17:
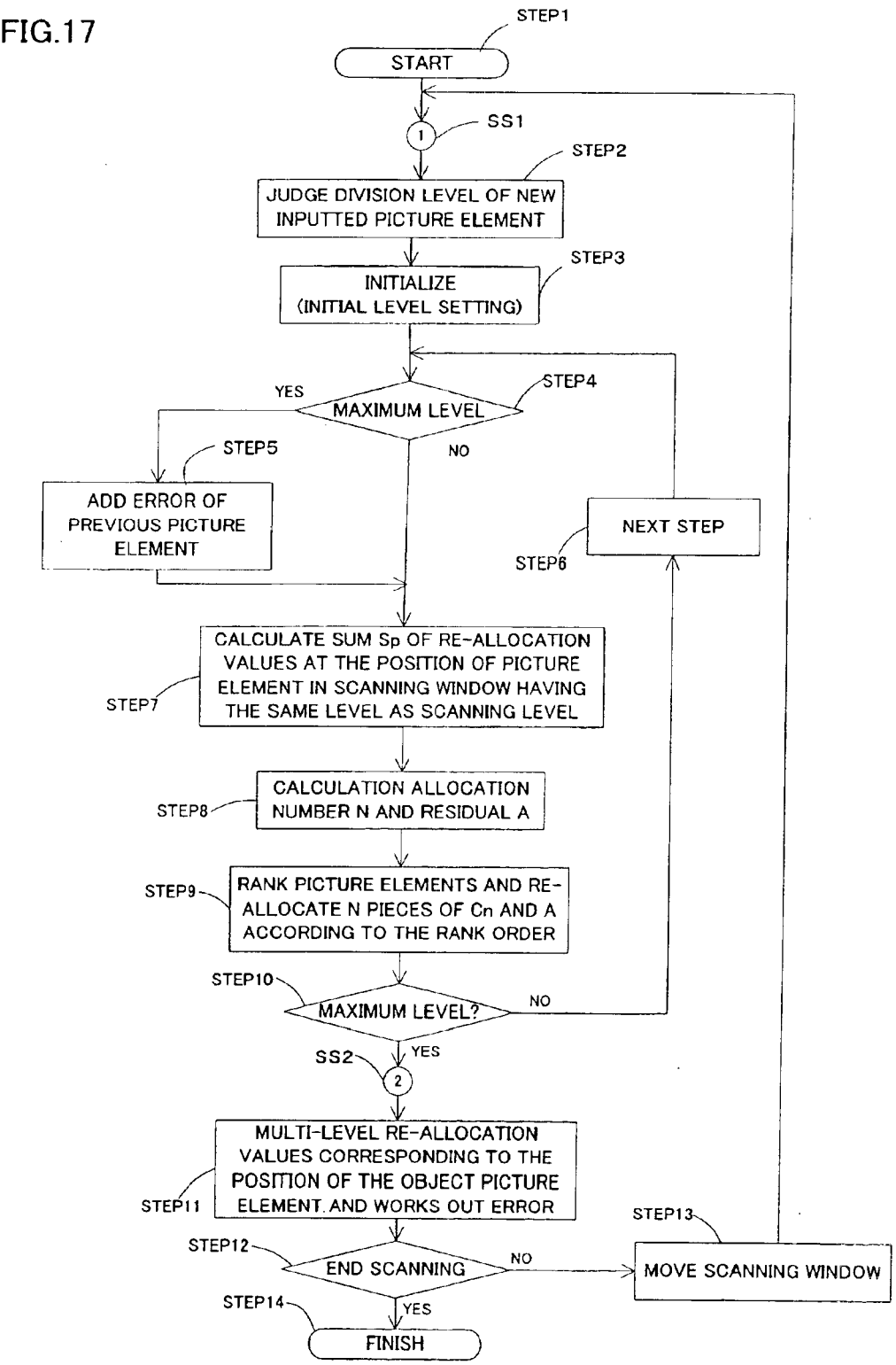
FIG. 17 is a flow chart of the image processing method in a ninth embodiment of the present invention.

FIG. 17 is a flow chart of the image processing method in a ninth embodiment of the present invention.

In this FIG. 17, positions SS1, SS2 may be ignored in the present embodiment, because they are to be used in explaining the embodiment which will be described later.

First, to which level, the first, second or third, the division level of new input pixel belongs is judged (it should be assumed that the levels of other pixels are already judged and known), followed by initial setting of the division level. That is, the level is set to the minimum division level (FIG. 17, Steps 2→3). Furthermore, whether the division level, the object of processing, is the maximum division level or not is determined. If the level is not the maximum division level, the process proceeds to the next step (Step 8). If the level is the maximum division level, the multi-leveling error of the pixel just before in the present embodiment is added to the sum of the re-allocation values on the maximum division level before the process proceeds to the next step (Steps 4→5).

The next step is to work out sum Sp of re-allocation values in the pixel positions in the scanning window corresponding to the same level as the ob division level of processing. The sum Sp is divided by the specific value Cn (in case of the four-leveled, value "85") to find allocation number N and residual A (FIG. 17, Steps 7→8). Then, the rank order of the pixels on the processing division level is decided (FIG. 16(b)). And N pieces of the specific value Cn and residual A are re-allocated within the object division level (Step 9). Whether the object division level is the maximum division level or not is judged. If the level is not the maximum division level, the process proceeds to the next step (FIG. 17, Steps 10→6→4).

Finally, the re-allocation value at the position of the object pixel is multi-leveled, and the multi-leveling error, that is, the difference between multi-leveled data and re-allocated data is worked out (FIG. 17, Step 12). Needless to say, all the processings are carried out on every scanning (FIG. 17, Steps 13: N→Step 14→Step 2).

The effects of the image processing method in Embodiment 9 just described are just the same as those described in Embodiment 1, with re-allocation of density carried out across the division levels. Therefore, letters and line drawings are kept from blurring, and thus high quality multi-leveled images can be reproduced.

Processing by software and processing by hardware are exactly the same in principle and effect. The difference is this. The processing method by hardware carries out, in parallel, level division by first level division means 2, processing to find allocation number N and residual A by means 6 for calculation of allocation values by levels and processing by means 7 for re-allocation by levels. In the software method, each processing is performed level by level.

Embodiment 10

Figure 18:
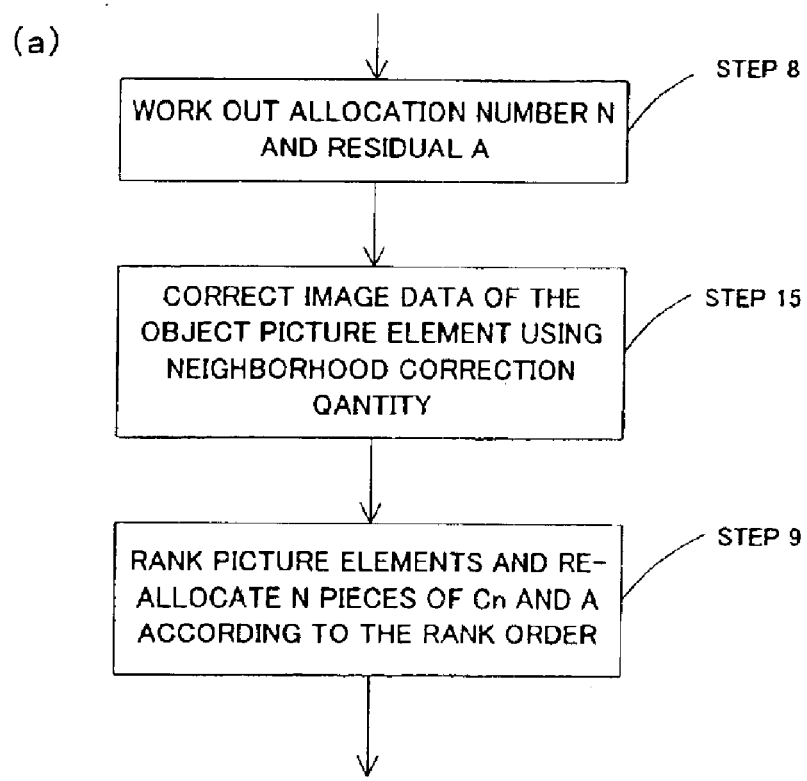
FIG. 18 is a flow chart of the modified part of the image processing method of a tenth embodiment of the present invention.
Figure 18:
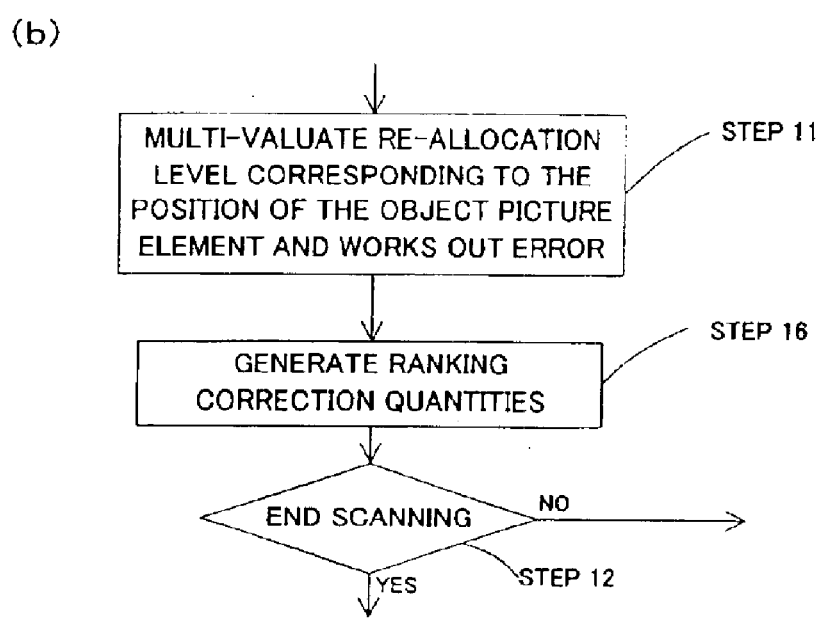

FIG. 18 is a flow chart of the modified part of the image processing method in which ranking described in Embodiment 2 is processed by software. The modified part of the flow chart shown in FIG. 17 is shown in FIG. 18(a), (b). The same processings as in FIG. 17 are indicated in the same step numbers.

First, between processing to find allocation number N and residual A shown in FIG. 17 (Step 8) and re-allocation (Step 9), neighborhood correction quantity calculation is performed on the basis of the ranking correction quantity around the object pixel to generate neighborhood correction quantity (see FIG. 10, numeral 161). The neighborhood correction quantity thus obtained is added to the image data of the object pixel, and the image data thus obtained is used instead of the image data of the object pixel to detect the ranking (FIG. 17, Step 15). In other words, part of the processing by ranking correction means 151 shown in FIG. 9 and the processing by second ranking means 144 are carried out here in this embodiment.

Then, between multi-leveling (Step 11) and final judgement (Step 12), the ranking correction quantity of the object pixel (see FIG. 10, numeral 160) is generated using multi-leveled image data, the object pixel and ranking correction quantities around the object pixel (Step 16). The ranking correction quantity and neighborhood correction quantity are generated in the way as described in Embodiment 2. That is, part of the remainder of the processing by ranking correction means 151 shown in FIG. 9 is carried out.

The effects thus obtained are the same as those in Embodiment 2. In such high density areas as letters and line drawings, the difference between multi-leveled data and inputted pixel data is small, and therefore, the neighborhood correction quantity becomes a small value. In half tone areas like gravure, on the other hand, the difference is large, and the neighborhood correction quantity becomes a large value. In half tone areas, therefore, the present configuration has much effects on ranking, and is effective in keeping down the concentration of density. That can improve the picture quality in such areas as half tone where it is desired to disperse the density.

Embodiment 11

Figure 19:
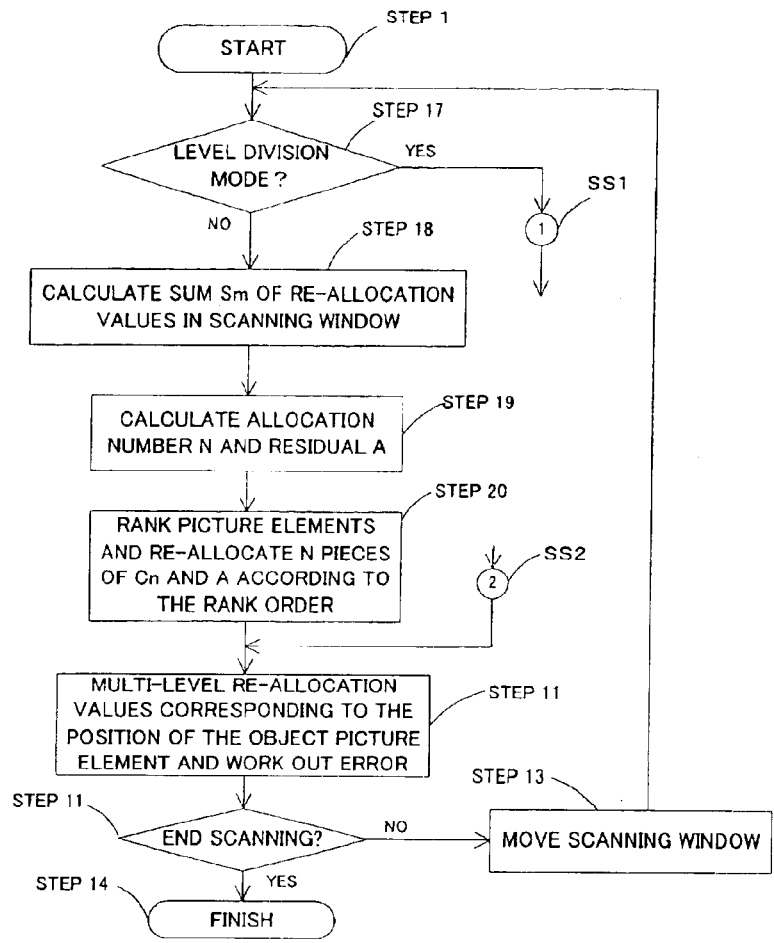
FIG. 19 is a flow chart of the image processing method of an eleventh embodiment of the present invention.

FIG. 19 is a flow chart of the image processing method in which the same effects as those by the image processing apparatus of Embodiment 5 (FIG. 13) are produced using software. The same processings as in FIG. 17 are indicated in the same step numbers. It is also noted that between positions SS1 and SS2, processing with level division in FIG. 17 and processing without level division in FIG. 19 are used in combination.

First, the level division mode that indicates whether data is to be divided by levels or not is determined (FIG. 19, Step 17). The level division mode may be specified by the operator. Or it may be so arranged that the mode is automatically set to level division for letters and line drawings and to non-level division for half tone areas using judgement results of automatic identification means that distinguishes between letters and line drawings and half tone areas. In case data is to be divided in levels, the procedure proceeds to position SS1 and performs the same processings as shown in FIG. 17 until position SS2.

In case data is not be divided in levels, sum Sm of re-allocation values in the scanning window is worked out (FIG. 19, Step 18). Then, sum Sm thus worked out is divided by the specific value (in the case of the four-level, value "85") to find allocation number N and residual A (Step 19). Furthermore, the rank order is decided using all the pixels in the scanning window, and N pieces of the specific value and residual A are re-allocated according to the rank order. Thus, the procedure proceeds to multi-leveling (Step 20→Step 11).

The above-mentioned processing produces exactly the same effects as in Embodiment 5. While the problem is that in case re-allocation values are not divided by levels, letters and line drawings can blur, that is effective in smoothing half tone areas, increasing the smoothness of images. Therefore, it is so configured that whether data is divided in levels or not can be selected by level division mode (image processing mode) so that high picture quality can be obtained depending on input image.

The use of ranking correction (not shown) described in Embodiment 10 in combination can further increase the smoothing effect.

Embodiment 12

Figure 20:
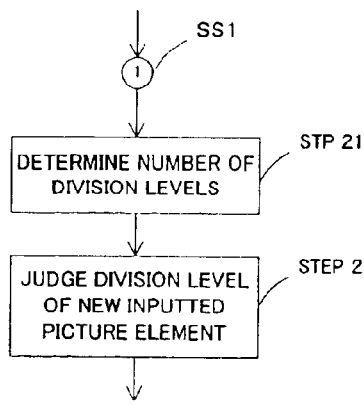
FIG. 20 is a flow chart of the modified part of the image processing method of a twelfth embodiment of the present invention.

FIG. 20 is a flow chart of the image processing method in which the number of division levels is changed according to the present invention. The same processings as in the flow chart in FIG. 17 are indicated by the same step numbers. The flow chart in FIG. 20 is identical with that in FIG. 17 except for what will be described. Embodiment 12 achieves the same results using software as the image processing apparatus shown in Embodiment 7.

That is, a step (Step 21) to decide the number of division levels is added between position SS1 and division level determination (Step 2). That permits changing the number of divisions properly according to image.

The embodiments of the present invention have been described with the multi-leveled level as four-leveled. But the present invention is not limited to the four-leveled. Multi-leveled values (the above specific values) do not have to be evenly divided for each level. Values adapted for the characteristics of output device are used.

It is also noted that the same processings by software shown in Embodiments 9 to 12 may be realized by hardware. Furthermore, the present invention has been described with a two-row, two-column scanning window but not limited to the two-row, two-column size.

What is claimed is:

1. A method for multi-valuation processing of image data wherein an original image is quantized into n-levels and outputted, said method comprising the steps of:

ranking the respective pixels in an area according to the value of the image data of said pixels, said area being a scanning window in an original image data containing an object pixel, pixels around said object pixel and an input pixel and said ranking effected in said scanning window, level division to extract the pixels belonging to the same division levels, the pixels being obtained when the image data of the respective re-allocated pixels and said input pixel are divided in (n−1) levels in said scanning window, calculating, by levels, an allocation number or quotient and residual by working out the sum of re-allocation values or the sum of image data of said respective level divided pixels, said quotient and residual obtained when said re-allocation value sum is divided by the specific value, re-allocating, by levels, said specific value and said residuals in said allocation number according to said rank order, and multi-leveling and outputting the sum of re-allocation values at the position of said object pixel.

2. The method for multi-valuation processing of image data as defined in claim 1 wherein in said level division, said image data of the input pixel are is divided into (n−1) levels and placed in the scanning windows for respective levels, in addition to the respective pixels already re-allocated in the scanning windows for respective levels.

3. The image processing method as defined in claim 1 wherein in said level division, after said input image data are put in the sum image data, by levels, of the respective pixels re-allocated in said scanning window, the data in the scanning window are divided in (n−1) levels.

4. The image processing method as defined in claim 3 wherein a level synthesis step is interposed before said level division, said level synthesis step being for adding up the output of said re-allocation by levels by pixels on the respective levels to acquire the sums thereof by pixels.

5. The image processing method as defined in claim 1 wherein, based on the image data of said pixels, a level for the (n−1) level-divided image data of original image belonging to the scanning window is determined, and further wherein the image data of said pixels as well as respective for said level, re-allocated in said scanning windows for the determined levels, are extracted.

6. The image processing method as defined in claim 2 wherein in said level division, image data belonging to the range of the object division level is given a value obtained by subtracting the maximum value on the level immediately below from said image data; image data not smaller than the maximum value of the object division level is given the maximum value of the object division level; and image data not higher than the minimum value of the object division level is given "0".

7. The image processing method as defined in claim 2 wherein in said level division, image data belonging to the range of the division level of the processing object is left as it is, and image data outside the range of the division level of the processing object is given "0".

8. The image processing method as defined in claim 2 wherein after calculating the sum of data at the object pixels of the respective levels, said multi-leveling step multi-valuates said sum.

9. The image processing method as defined in claim 4 wherein said multi-leveling step multi-valuates the sum of image data at the object pixels of the respective levels obtained from said level synthesis step.

10. The image processing method as defined in claim 1 wherein said specific number n is changed at will.

11. The image processing method as defined in claim 1 wherein said specific value is the range between the divided levels.

12. The image processing method as defined in claim 1 wherein said re-allocation step adds an error to the re-allocation value sum of one of the division levels in the subsequent processing, said error obtained when the re-allocation value at the position of said object pixel and the re-allocation value at said object pixel are quantized into n-levels.

13. The image processing method as defined in claim 12 wherein said re-allocation value sum of one of the division levels is the sum of the re-allocation values of the division levels of the pixel having the maximum level in said scanning window.

14. The image processing method as defined in claim 1 said method comprising the steps of:

ranking correction to find neighborhood correction quantity proportional to the mean value of the ranking correction quantity of pixels in a specific number in said neighborhood on the basis of the ranking correction quantity of pixels in the specific number in the neighborhood of the pixels at the position of the object pixel and to generate a new ranking correction quantity to which are added the difference between the mean value and the multi-leveled data of the object pixel obtained from said multi-leveling step and said mean value, and ranking image data of the object pixel after correcting said image data of the object image on the basis of said neighborhood correction quantity, said image data of the object image contained in the scanning window of the original image.

15. The image processing method as defined in claim 14 wherein said neighborhood correction quantity is controlled by external signals.

16. A method for multi-valuation processing of image data, wherein an original image is quantized into n-levels and outputted, said method provided with switchover arrangements to choose between two different re-allocation ways of getting re-allocation values and a multi-leveling step of multi-leveling the output of said switchover arrangements, and one of said two different re-allocation ways comprising the steps of:

ranking the respective pixels in a scanning window of an original image, said ranking effected in said scanning window according to the value of the image data of said pixels, and said scanning window containing an object pixel, pixels around said object pixel and an input pixel, level division to extract the pixels belonging to the same division levels, the pixels being obtained when the image data of the respective pixels already re-allocated in said scanning window in the preceding processing and said input pixel are divided in (n−1) levels, calculating, by levels, the allocation number or quotient and residual by working out the sum of re-allocation values or the sum of image data of said respective level divided pixels, said quotient and residual obtained when said re-allocation value sum is divided by a specific value, re-allocating, by levels, said specific value and said residuals in said allocation number according to said rank order, and level synthesis to work out the sum of the respective pixels re-allocated by levels in said processing, and the other of said two re-allocation ways comprising the steps of:

said ranking that is provided in the first re-allocation way, calculating the allocation number or quotient and residual by working out the sum of re-allocation values or the sum of image data of the respective pixels already re-allocated in said scanning window in the previous processing and said input pixel, said quotient and residual obtained when said re-allocation value sum is divided by a specific value, and re-allocating said specific value and said residuals in the allocation number according to said rank order.

17. An apparatus for multi-valuation processing of image data wherein an original image is quantized into n-levels and outputted, said apparatus comprising:

ranking means for ranking respective pixels in a scanning window of an original image according to the value of the image data of said pixels, said scanning window containing an object pixel, pixels around said object pixel and an input pixel, and ranking effected in said scanning window, level division means for extracting the pixels belonging to the same division levels, the pixels being obtained when the image data of the respective pixels already re-allocated in said scanning window in the preceding processing and said input pixel are divided in (n−1) levels, means for calculation of allocation values by levels for calculating the sum of re-allocation values or the sum of image data of said respective level divided pixels to acquire the allocation number or quotient and residual obtained when said re-allocation value sum is divided by a specific value, means for re-allocation by levels for re-allocating, by levels, said specific value and said residuals in said allocation number according to said rank order, and multi-leveling means for n-leveling and outputting the sum of re-allocation values at the position of said object pixel.

18. The apparatus for multi-valuation processing of image data as defined in claim 17 wherein said level division means divides said image data of the input pixel in (n−1) levels and places the values obtained in the scanning windows for the respective levels, in addition to the respective pixels already re-allocated in the scanning windows for the respective levels.

19. The apparatus for multi-valuation processing of image data as defined in claim 17 wherein after putting said image data of the input pixel in the image data of the sum, by levels, of the respective pixels re-allocated in said scanning window, said level division means divides the data in the scanning window in (n−1) levels.

20. The image processing apparatus as defined in claim 19 wherein level synthesis means is interposed before level division means, said level synthesis means being for adding up the outputs of said storage means for re-allocation by levels by pixels on the respective levels and acquiring the sum thereof.

21. The image processing apparatus as defined in claim 17 wherein, based on the image data of said pixels, a level for the (n−1)-level-divided image data of original image belonging to the scanning window is determined, and further wherein the image data of said pixels as well as respective pixels for said level, re-allocated in said scanning windows for the determined levels, are extracted.

22. The image processing apparatus as defined in claim 18 wherein said level division means gives a value obtained by subtracting the maximum value of the level immediately below from said image data to the image data belonging to the range of the division level, the maximum value of the object division level to the image data not smaller than the maximum value of the object division level and "0" to the image data not larger than the minimum value of the object division level.

23. The image processing apparatus as defined in claim 18 wherein said level division means leaves the image data belonging to the range of the object division level as they are and gives "0" to the image data outside the range of the object division level.

24. The image processing apparatus as defined in claim 18 wherein said multi-leveling means calculates the sum of the data for the object pixels of the respective levels and multi-valuates said sum.

25. The image processing apparatus as defined in claim 20 wherein said multi-leveling means acquires from said level synthesis means the sum of data for the object pixels of the respective levels and multi-valuates said sum.

26. The image processing apparatus as defined in clam 17, said apparatus comprising level control means which permits setting said specific number n according to the directions of the user or a higher level direction means, and wherein said level division means, means for calculation of re-allocation values and re-allocation means perform specific processings on the basis of specific number n.

27. The image processing apparatus as defined in claim 17 wherein said specific value is the range between the divided levels.

28. The image processing apparatus as defined in claim 17 wherein said re-allocation means adds an error to the sum of re-allocation values of one of the division levels in the subsequent processing, said error obtained by multi-leveling means when the re-allocation value at the position of said object pixel and the re-allocation value at said object pixel are n-multi-leveled.

29. The image processing apparatus as defined in claim 28 wherein one of said division levels is the maximum level in said scanning window.

30. The apparatus for multi-valuation processing of image data as defined in claim 17, said apparatus comprising:

ranking correction means for finding a neighborhood correction quantity proportional to the mean value of the ranking correction quantity of pixels in a specific number in the neighborhood of the pixels at the position of the object pixel on the basis of the ranking correction quantity of pixels in the specific number in said neighborhood and generating a new ranking correction quantity to which are added the difference between a mean value and the multi-leveled data of the object pixel outputted from said multi-leveling means, said mean value being the mean value of ranking correction quantities of pixels in a specific number in said neighborhood, and ranking means for ranking object the object pixel after correcting image data of the object pixel on the basis of said neighborhood correction quantity, said image data of the object image contained in the scanning window of the original image.

31. An apparatus for multi-valuation processing of image data wherein an original image is quantized into n-levels and outputted, said apparatus provided with switchover means for switching re-allocation values outputted from two different re-allocation means and multi-leveling means for multi-leveling the outputs of said switchover means, one of said re-allocation means comprising:

ranking means for ranking the respective pixels in a scanning window of the original image, said ranking effected in said scanning window according to the value of the image data of said pixels, and said scanning window containing an object pixel, pixels around said object pixel and an input pixel, level division means for extracting the pixels belonging to the same division levels, the pixels being obtained when the image data of the respective pixels already re-allocated in said scanning window in the preceding processing and said input pixel are divided in (n−1) levels, means for calculation of allocation values by levels for calculating, by levels, the sum of re-allocation values or the sum of image data of said respective level divided pixels and acquiring the allocation number or quotient and residual obtained when said re-allocation value sum is divided by a specific value, means for re-allocation by levels for re-allocating, by levels, said specific value and said residuals in said allocation number according to said rank order, and level synthesis means for acquiring the sum of the respective pixels re-allocated by levels in said processing, and the other of said two re-allocation means comprising:

said ranking means provided in the first re-allocation means, means for calculation of re-allocation values for calculating the sum of re-allocation values or the sum of image data of the respective pixels re-allocated in said scanning window in the preceding processing and of said input pixel and acquiring the allocation number or quotient and residual obtained when said re-allocation value sum is divided by a specific value, and re-allocation means for re-allocating said specific value and said residuals in the allocation number according to said rank order.

32. The image processing apparatus as defined in claim 30 wherein said neighborhood correction quantity can be controlled by external signals.

* * * * *